(12) United States Patent
Choong

(10) Patent No.: US 8,230,570 B1
(45) Date of Patent: Jul. 31, 2012

(54) AUTOMATIC GRAVITY VACUUM SCREW FEEDING

(75) Inventor: Kooi Hoe Choong, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 481 days.

(21) Appl. No.: 12/484,032

(22) Filed: Jun. 12, 2009

(51) Int. Cl.
*B23Q 17/00* (2006.01)
*B25B 23/04* (2006.01)

(52) U.S. Cl. ...................................... 29/407.02; 81/430

(58) Field of Classification Search ............... 29/407.02, 29/407.01, 407.03, 407.09, 428, 525, 525.01, 29/525.11, 705, 707, 718, 709, 743; 81/430, 81/52, 54; 173/1, 181, 4; 227/112
See application file for complete search history.

(56) References Cited

U.S. PATENT DOCUMENTS

| | | | |
|---|---|---|---|
| 2,273,268 A | 2/1942 | Hunter et al. |
| 2,314,760 A | 3/1943 | Blair |
| 2,657,721 A | 11/1953 | Shaff |
| 3,275,047 A | 9/1966 | Kulman |
| 3,583,451 A | 6/1971 | Dixon et al. |
| 3,680,194 A | 8/1972 | Monaghan et al. |
| 4,495,841 A | 1/1985 | Mori et al. |
| 4,627,316 A | 12/1986 | Mori et al. |
| 4,669,359 A | 6/1987 | Shiba |
| 4,790,234 A | 12/1988 | Hampejs et al. |
| 4,800,325 A | 1/1989 | Nakanishi |
| 4,813,312 A | 3/1989 | Wilhelm |
| 4,881,435 A | 11/1989 | Hansson |
| 4,908,926 A | 3/1990 | Takeshima et al. |
| 4,922,436 A | 5/1990 | Dohm et al. |
| 4,924,732 A | 5/1990 | Hoskins et al. |
| 4,955,476 A | 9/1990 | Nakata et al. |
| 5,010,286 A | 4/1991 | Nakamura et al. |
| 5,019,763 A | 5/1991 | Komatsu |
| 5,059,089 A | 10/1991 | Kocaoglan |
| 5,090,103 A | 2/1992 | Nakata et al. |
| 5,121,558 A | 6/1992 | Caroe et al. |
| 5,154,242 A | 10/1992 | Soshin et al. |
| 5,170,852 A | 12/1992 | Shikata et al. |
| 5,186,084 A | 2/1993 | Totsu |
| 5,215,270 A | 6/1993 | Udocon et al. |
| 5,270,625 A | 12/1993 | Neff |
| 5,289,886 A | 3/1994 | Shikata et al. |
| 5,345,766 A | 9/1994 | Leonhartsberger et al. |
| 5,359,269 A | 10/1994 | Wedeen et al. |
| 5,480,087 A | 1/1996 | Young et al. |
| 5,511,933 A | 4/1996 | Herklotz |
| 5,549,169 A | 8/1996 | Matsumura et al. |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner* — John C Hong

(57) ABSTRACT

An electric screwdriver is coupled to an automatic screw feeding adaptor defining a screw path having a proximal end, a middle region and a distal end. A first screw is received within the screw feeding adaptor and held at a driving position near the distal end of the screw path by applying a distal partial vacuum within the screw feeding adaptor. The first screw is driven, and a torque applied to the first screw is detected. The torque is compared to a minimum torque threshold, and a second screw is moved along the screw path based at least in part upon the comparison.

11 Claims, 20 Drawing Sheets

U.S. PATENT DOCUMENTS

| | | | |
|---|---|---|---|
| 5,631,823 A | 5/1997 | Layer et al. | |
| 5,631,852 A | 5/1997 | Chen | |
| 5,708,586 A | 1/1998 | Ikeda | |
| 5,839,332 A | 11/1998 | Fujiyama et al. | |
| 6,086,292 A | 7/2000 | Yokoyama | |
| 6,247,387 B1 | 6/2001 | Ketteringham | |
| 6,418,818 B1 | 7/2002 | Tham et al. | |
| 6,497,036 B1 | 12/2002 | Jenkins et al. | |
| 6,543,119 B2 | 4/2003 | Jenkins et al. | |
| 6,680,595 B2 | 1/2004 | Ito | |
| 6,681,659 B2 | 1/2004 | Hoe et al. | |
| 6,701,212 B2 | 3/2004 | Shiba et al. | |
| 6,840,929 B2 | 1/2005 | Kurata | |
| 6,945,140 B2 | 9/2005 | Gibbons et al. | |
| 7,077,621 B2 | 7/2006 | Ruden | |
| 7,178,432 B1 | 2/2007 | Han et al. | |
| 7,400,106 B2 | 7/2008 | DeCicco et al. | |
| 7,458,282 B1 | 12/2008 | Wuester, Sr. et al. | |
| 7,506,553 B1 | 3/2009 | Panyavoravaj | |
| 7,549,204 B1 | 6/2009 | Vangal-Ramamurthy et al. | |
| 7,980,159 B1 * | 7/2011 | Han | 81/430 |
| 2001/0035087 A1 | 11/2001 | Subotnick | |
| 2005/0039580 A1 | 2/2005 | Gibbons et al. | |
| 2005/0196264 A1 | 9/2005 | Ruden | |
| 2008/0230245 A1 * | 9/2008 | Matsunaga | 173/4 |

OTHER PUBLICATIONS

Microtec Systems, "Components and Systems for Total Process Controlled Screw Tightening", Microtec Systems Torque Competence, 2005/2006, pp. 1-30.

* cited by examiner

AUTOMATIC GRAVITY VACUUM SCREW FEEDING

BACKGROUND

A conventional hard disk drive includes a head disk assembly (HDA) and a printed circuit board assembly (PCBA) attached to a disk drive base of the HDA. The HDA can include, inter alia, at least one magnetic disk, a spindle motor for rotating the disk(s), and a head stack assembly. The spindle motor further includes a spindle motor hub that is rotatably attached to the disk drive base. Many of these disk drive components are assembled using conventional screws.

As a result of continuing disk drive miniaturization, many disk drive components have become too small to be consistently, speedily and reliably handled by human hands. In particular, the screws used in smaller disk drives are difficult to pick up, couple to a screwdriver and drive into a selected threaded hole. Such issues have led to the development of electric screwdriver systems. A typical electric screwdriver requires an operator to pick screws from a shaker tray before driving them into designated fixtures. That is, before driving a screw, the operator must swing the electric screwdriver over to the shaker tray, couple a screw to the bit of the electric screwdriver and then swing the electric screwdriver in position over the disk drive to drive the screw. After the screw has been driven, the operator must once again swing the electric screwdriver back over the shaker tray to couple the next screw to the electric screwdriver. This repetitive process of moving the electric screwdriver back and forth between the shaker tray and the disk drive is time consuming and can decrease a manufacturing line's yield.

Electric screwdrivers with automatic screw feeding systems do exist but typically rely on a blow feed system to feed the screws to the screwdriver. Such blow feed systems use a blast of air to carry a screw from its source to a position in which it may be engaged by the screwdriver's bit. This blast of air escapes from the screwdriver in the vicinity of the bit and may thus carry particulate matter and other contaminants to the work area. Electric screwdrivers featuring blow feed systems are, therefore, unsuitable for environments in which contamination should be minimized, such as clean room environments.

There is therefore a need for an improved electric screwdriver assembly with automatic screw feeding.

DETAILED DESCRIPTION

Figure 1:
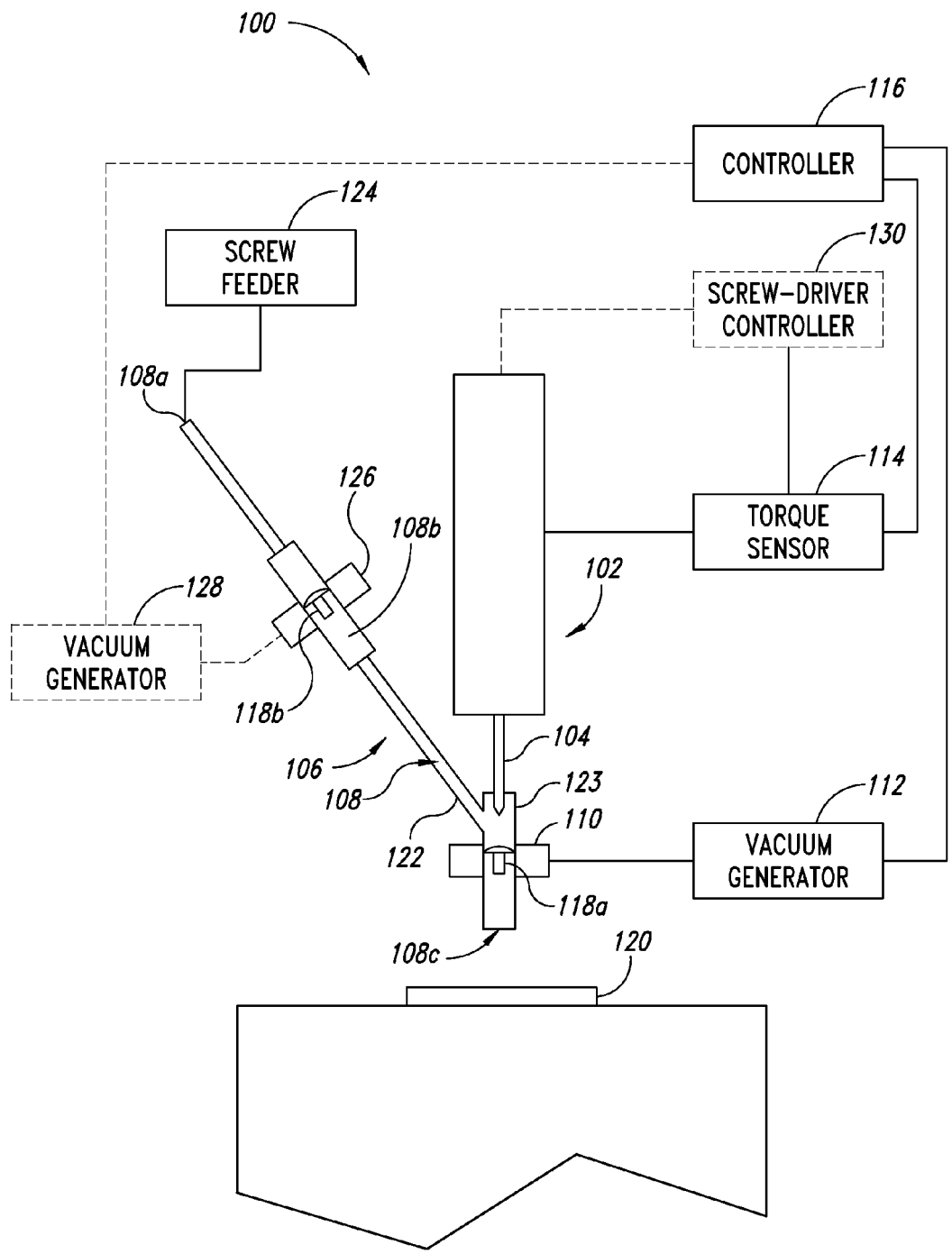
FIG. 1 is a schematic view of an electric screwdriver assembly, according to one illustrated embodiment.

Referring to FIG. 1, an electric screwdriver assembly 100 is schematically illustrated, according to one embodiment. The electric screwdriver assembly 100 comprises an electric screwdriver 102 including a bit 104, and an automatic screw feeding adaptor 106 coupled to the electric screwdriver 102. The automatic screw feeding adaptor 106 defines a screw path 108 having a proximal end 108a, a middle region 108b and a distal end 108c. A distal vacuum coupling assembly 110 is configured to couple a vacuum generator 112 to the screw feeding adaptor 106 in order to generate a distal partial vacuum near the distal end 108c of the screw path 108. The electric screwdriver assembly 100 further includes a torque sensor 114 configured to detect torque applied by the electric screwdriver 102, and a controller 116 coupled to the torque sensor 114 and configured to control the distal partial vacuum. The controller 116 may be operable to hold a first screw 118a at a driving position near the distal end 108c of the screw path 108 by applying the distal partial vacuum, receive torque information indicative of a torque applied to the first screw 118a by the electric screwdriver 102 exceeding a minimum torque threshold, and move a second screw 118b along the screw path 108 based at least in part on the torque information.

The electric screwdriver assembly 100 may be used to drive the first and second screws 118a, b (collectively, 118) into any of a variety of workpieces. In one embodiment, as illustrated, the electric screwdriver assembly 100 drives the screws 118 into a workpiece 120, which may comprise one or more components of a disk drive. For example, the workpiece 120 may include a printed circuit board assembly (PCBA) and disk drive base of a disk drive, and the screws 118 may be used to couple the PCBA to the disk drive base. In other embodiments, the electric screwdriver assembly 100 may be used to drive screws 118 into other workpieces, such as electronic storage devices, personal media devices, cellular phones, small toys, or other products employing screws.

The electric screwdriver 102 may comprise any of a variety of electronically controlled screwdrivers. The torque and precision specifications of the electric screwdriver 102 may vary substantially depending upon a manufacturing line into which the electric screwdriver assembly 100 is incorporated. In one embodiment, the electric screwdriver 102 includes a bit 104 shaped, sized and configured to engage and drive the screws 118. The bit 104 may have any of a variety of configurations in order to drive screws of different types, and, in some embodiments, the bit 104 of the electric screwdriver 102 may be replaceable in order to accommodate different screws. The bit 104 may also be formed from a variety of different materials, depending upon the screws being driven and acceptable particulate levels for the manufacturing process. In one embodiment, the electric screwdriver 102 further includes a housing (not shown in FIG. 1). The housing may allow the bit 104 to move up and down during a driving operation and may couple directly to the automatic screw feeding adaptor 106.

The automatic screw feeding adaptor 106 may comprise a number of different components coupled to the electric screwdriver 102 and configured to guide screws 118 to a driving position near the distal end 108c of the screw path 108. In one embodiment, as illustrated, the automatic screw feeding adaptor 106 comprises a screw feeder tube 122 and a distal screw conduit 123. The screw feeder tube 122 and the distal screw conduit 123 may combine to define the screw path 108. In other embodiments, the automatic screw feeding adaptor 106 may include differently configured components that define at least part of the screw path 108.

The screw feeder tube 122 may include one or more cylindrical components with different diameters and surface configurations. In one embodiment, a majority of the screw feeder tube 122 may form an enclosed passage that is only slightly larger than the screws 118 that pass therethrough. This may help prevent the screws 118 from flipping around as they travel along the screw path 108. The screw feeder tube 122 may comprise any of a variety of materials. In one embodiment, the screw feeder tube 122 may comprise polyurethane and may be partially transparent, to enable an operator to watch the screws 118 on the screw path 108.

The distal screw conduit 123 may couple to a distal portion of the screw feeder tube 122 and may connect to the screwdriver 102. In one embodiment, the distal screw conduit 123 defines the driving position as well as the distal end 108c of the screw path 108. The bit 104 of the screwdriver 102 may also be configured to travel through the distal screw conduit 123. Thus, in one embodiment, when the first screw 118a is in the distal screw conduit 123, the bit 104 may engage and drive the first screw 118a. The distal screw conduit 123 may comprise any of a variety of materials.

A proximal end 108a of the screw feeding adaptor 106 may be coupled to a source of screws, such as screw feeder 124. In one embodiment, screws 118 may be dispensed from the screw feeder 124, one at a time, under the force of gravity into the screw feeder tube 122. In another embodiment, other methods (e.g., vacuum feeding) may be used to provide screws from the screw feeder 124 to the proximal end 108a of the screw feeding adaptor 106.

The screw feeding adaptor 106 may have varying lengths and orientations. In one embodiment, from the proximal end 108a to the distal end 108c of the screw path 108, the screw feeding adaptor 106 may be oriented generally vertically, so as to enable screws 118 to pass therethrough under the force of gravity. Such an orientation is illustrated in FIG. 1. As used herein, the phrase, generally vertically, may be contrasted with a horizontal orientation, wherein a screw 118 would be unable to move through the screw feeding adaptor 106 under the force of gravity, and the phrase does not imply a perfectly vertical orientation.

The distal vacuum coupling assembly 110 may comprise any of a variety of vacuum couplers/vacuum brackets coupled to the screw feeding adaptor 106. In one embodiment, the distal vacuum coupling assembly 110 at least partially surrounds a portion of the distal screw conduit 123 having holes defined therethrough. Thus, the distal vacuum coupling assembly 110 may be configured to enable the creation of a distal partial vacuum near the distal end 108c of the screw path 108 within the screw feeding adaptor 106.

As illustrated, the distal vacuum coupling assembly 110 may be configured to couple to a vacuum generator 112. The vacuum generator 112 may comprise any of a variety of vacuum generators and may be coupled to the distal vacuum coupling assembly 110 via one or more vacuum lines. In one embodiment, the vacuum generator 112 may be electronically controlled. In another embodiment, one or more electronically actuated valves (not shown) may be placed between the vacuum coupling assembly 110 and the vacuum generator 112 in order to control the partial vacuum generated within the screw feeding adaptor 106. In some embodiments, the vacuum generator 112 may also be used to generate partial vacuums in other components or at different locations in the electric screwdriver assembly 100 via additional vacuum lines.

The torque sensor 114 may comprise any of a variety of sensors configured to detect a torque applied by the bit 104 of the electric screwdriver 102. In some embodiments, the torque sensor 114 may be incorporated into a body of the electric screwdriver 102 as part of its internal circuitry. In other embodiments, the torque sensor 114 may be external to the electric screwdriver 102 and may determine the torque via a mechanical coupling with the electric screwdriver 102 or based on one or more electrical signals produced by the electric screwdriver 102.

The torque sensor 114 may be configured to generate any of a variety of analog or digital signals based upon the detected torque. In one embodiment, circuitry within the electric screwdriver 102 may receive information from the torque sensor 114 and may be configured to transmit an external electrical signal based upon the detected torque. For example, the electric screwdriver 102 may be programmed with a torque threshold, and the electric screwdriver 102 may set an external bit high when the torque threshold is exceeded based upon measurements taken by the torque sensor 114. In another embodiment, an external analog signal transmitted by the electric screwdriver 102 may vary based upon a torque applied by the bit 104. In different environments, different configurations for the torque sensor 114 may be used.

The controller 116 may be coupled to the torque sensor 114 (directly or indirectly) and configured to control the distal partial vacuum produced by the vacuum generator 112. In an embodiment in which the torque sensor 114 is incorporated into the electric screwdriver 102, the controller 116 may be coupled to the electric screwdriver 102 to receive torque information therefrom. As illustrated, in one embodiment, the controller 116 may be coupled directly to the electric screwdriver 102 and/or the torque sensor 114. However, in other embodiments, the controller 116 may be indirectly coupled to the torque sensor 114 via one or more external controllers or other circuitry.

The controller 116 may be operable to control the distal partial vacuum in a variety of ways. In one embodiment, the controller 116 may be coupled to the vacuum generator 112 and may be configured to control the vacuum produced by the vacuum generator 112. In another embodiment, the controller 116 may be coupled to one or more valves (not shown) positioned between the vacuum generator 112 and the distal vacuum coupling assembly 110. The controller 116 may be configured to open or close these valves in order to control the distal partial vacuum. In still other embodiments, different components may be controlled by the controller 116 in order to control the distal partial vacuum.

The controller 116 may comprise any of a variety of circuits and/or processors. In one embodiment, the controller 116 comprises a programmable logic controller (PLC) that may be programmed using a separate computer/processor. In some embodiments, the acts performed by the controller 116 may be represented by computer-readable instructions. However, in other embodiments, a hardware implementation of one or more of the acts may be used.

As described in greater detail below, the controller 116 may be operable to hold the first screw 118a at a driving position near the distal end 108c of the screw path 108 by applying a distal partial vacuum. The controller 116 may then receive torque information indicative of a torque applied to the first screw 118a by the electric screwdriver 102 exceeding a minimum torque threshold. The controller 116 may then move a second screw 118b along the screw path 108 based at least in part on the torque information. In one embodiment, when the torque exceeds the minimum torque threshold, this may be indicative of a successful screwing attempt. Thus, by checking the torque information, it may be ensured that the first screw 118a has been successfully screwed into the workpiece 120 and will not follow the bit 104 during retraction back along the screw path 108. This may help to prevent screw jams when earlier screws have not been successfully screwed.

In one embodiment, the electric screwdriver assembly 100 may further include a middle vacuum coupling assembly 126. The middle vacuum coupling assembly 126 may be configured to couple a second vacuum generator 128 to the screw feeding adaptor 106 in order to generate a middle partial vacuum in the middle region 108b. This middle partial vacuum may define a buffer position within the screw feeder tube 122 at which screws 118 might be held (as illustrated by the second screw 118b in FIG. 1). As illustrated, the second vacuum generator 128 may be completely independent of the vacuum generator 112. However, in other embodiments, there may be no separate vacuum generator, and the vacuum generator 112 may be coupled to both the middle vacuum coupling assembly 126 and the distal vacuum coupling assembly 110.

In one embodiment, the controller 116 may be configured to control the middle partial vacuum. For example, the controller 116 may be coupled to the second vacuum generator 128 and may be configured to control the middle partial vacuum produced by the second vacuum generator 128. In another embodiment, the controller 116 may be coupled to one or more valves (not shown) positioned between the second vacuum generator 128 (or the vacuum generator 112) and the middle vacuum coupling assembly 126. The controller 116 may be configured to open or close these valves in order to control the middle partial vacuum. In still other embodiments, different components may be controlled by the controller 116 in order to control the middle partial vacuum.

The electric screwdriver assembly 100 may further include a screwdriver controller 130 configured to control the screwdriver 102. In one embodiment, the screwdriver controller 130 may cause the screwdriver 102 to move up and down and may also control the rotation of the bit 104. In one embodiment, the screwdriver controller 130 may be coupled to the torque sensor 114 but may comprise separate controller circuitry from the controller 116. The screwdriver controller 130 may or may not be communicatively coupled to the controller 116. In other embodiments, the functionality of the screwdriver controller 130 may be incorporated into the controller 116.

Figure 2:
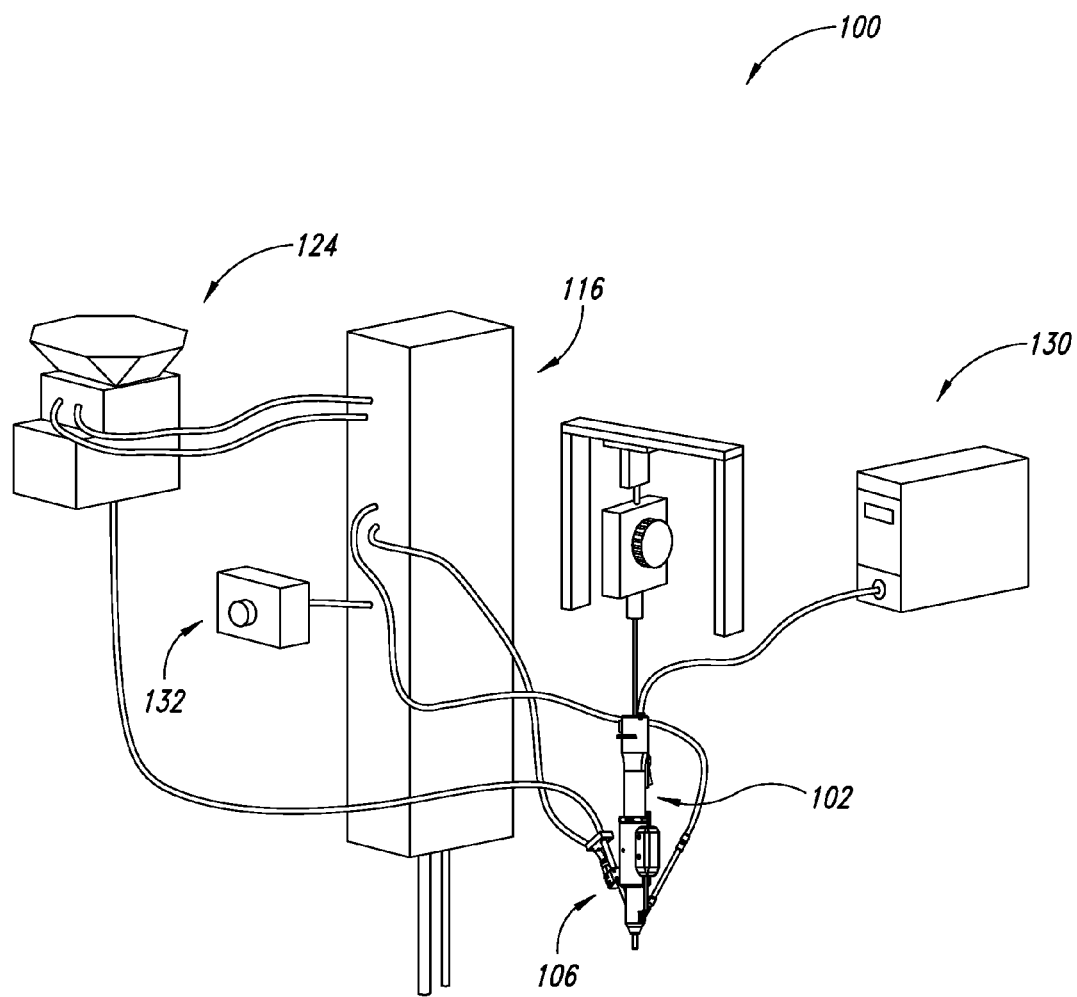
FIG. 2 is a perspective view of the electric screwdriver assembly of FIG. 1, according to one illustrated embodiment.

FIG. 2 is a perspective view of the electric screwdriver assembly 100 illustrated schematically in FIG. 1. As illustrated, the electric screwdriver 102 may be coupled to a screwdriver controller 130 housed separately from the controller 116. The screw feeder 124 may be configured to gravity feed screws one at a time into the screw feeding adaptor 106. As illustrated, the controller 116 may be further coupled to a start/reset button 132, by which an operator might easily start and stop the electric screwdriver assembly 100. In other embodiments, other user interfaces may be provided for interacting with the electric screwdriver assembly 100.

Figure 3:
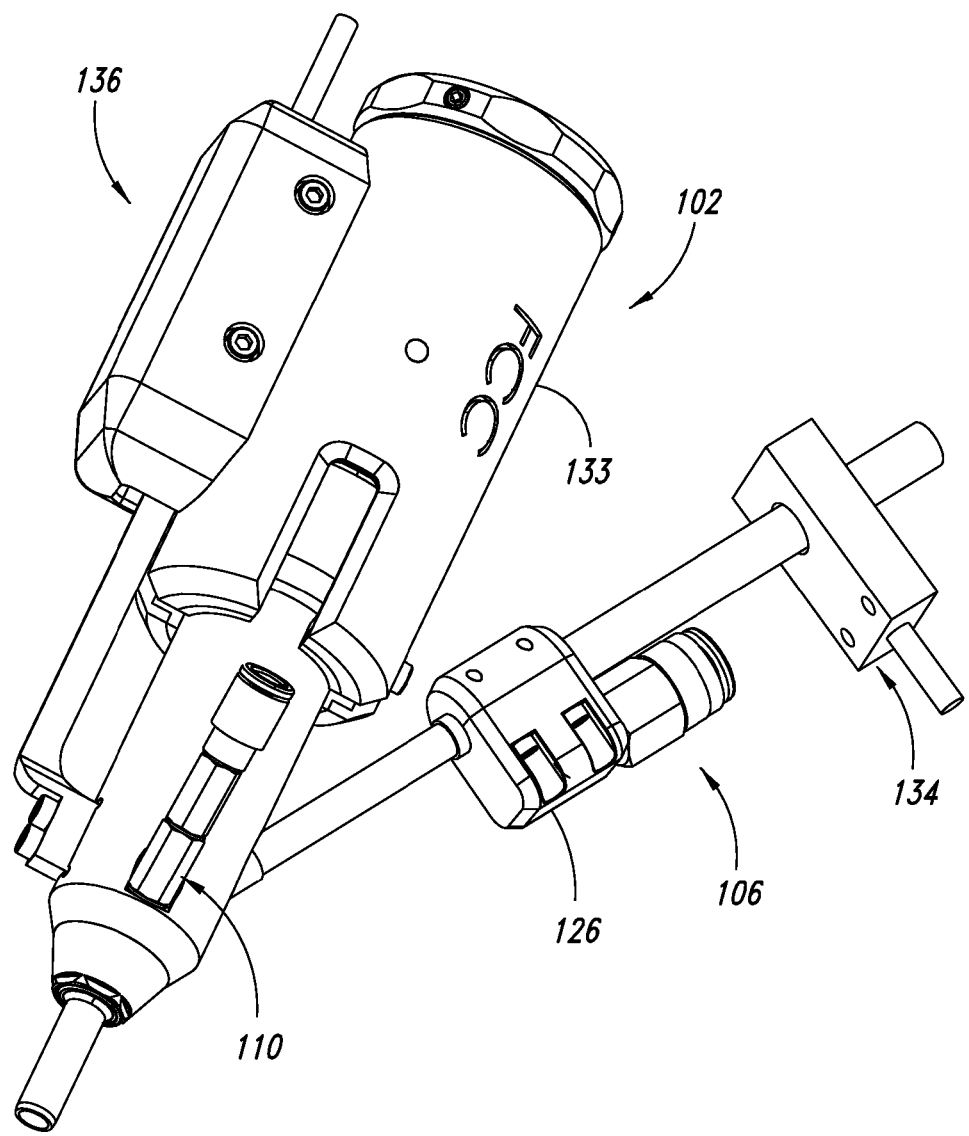
FIG. 3 is an enlarged perspective view of an electric screwdriver and an automatic screw feeding adaptor coupled to the electric screwdriver, according to one illustrated embodiment.
Figure 4:
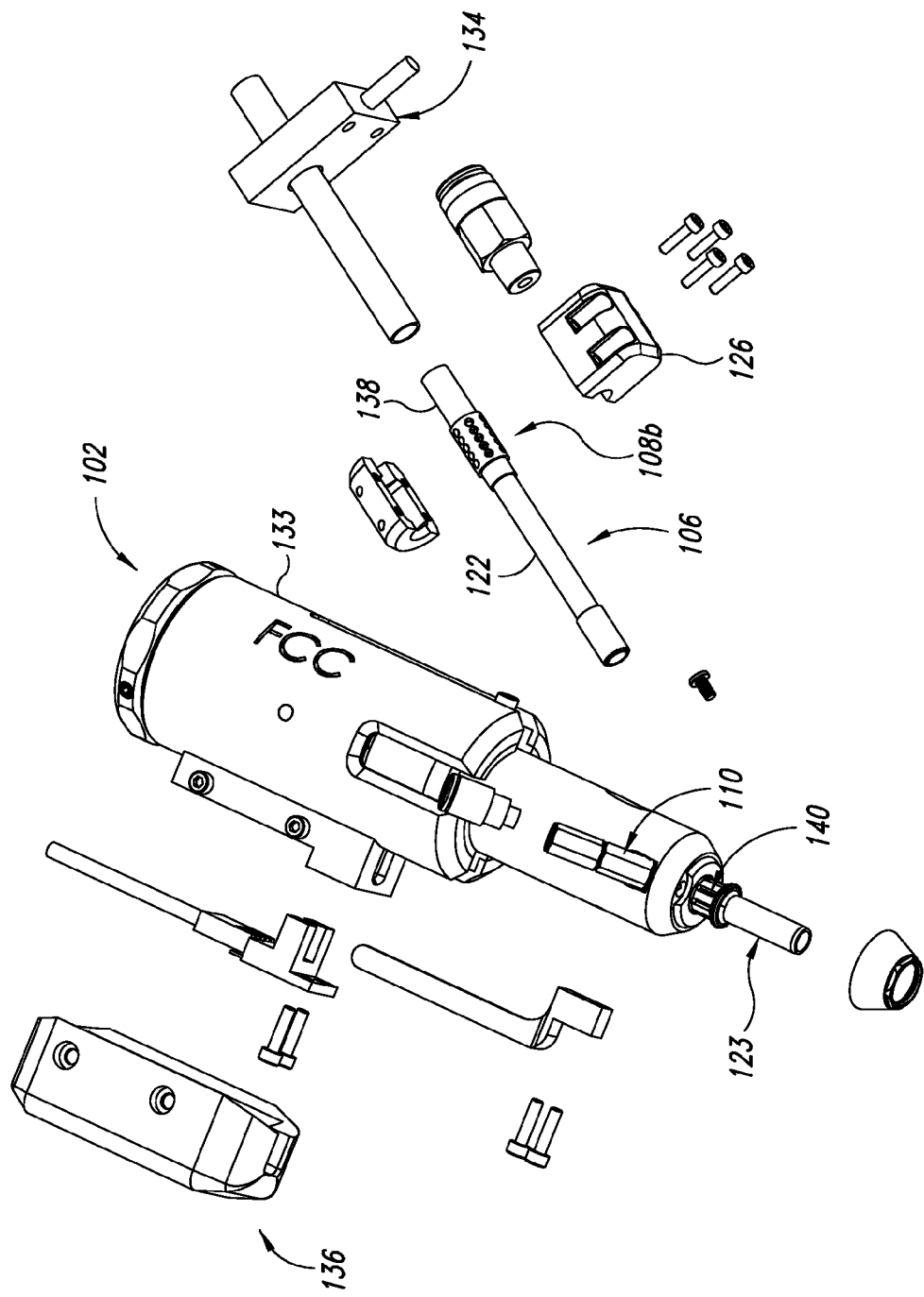
FIG. 4 is an exploded view of the electric screwdriver and the automatic screw feeding adaptor of FIG. 3, according to one illustrated embodiment.
Figure 5:
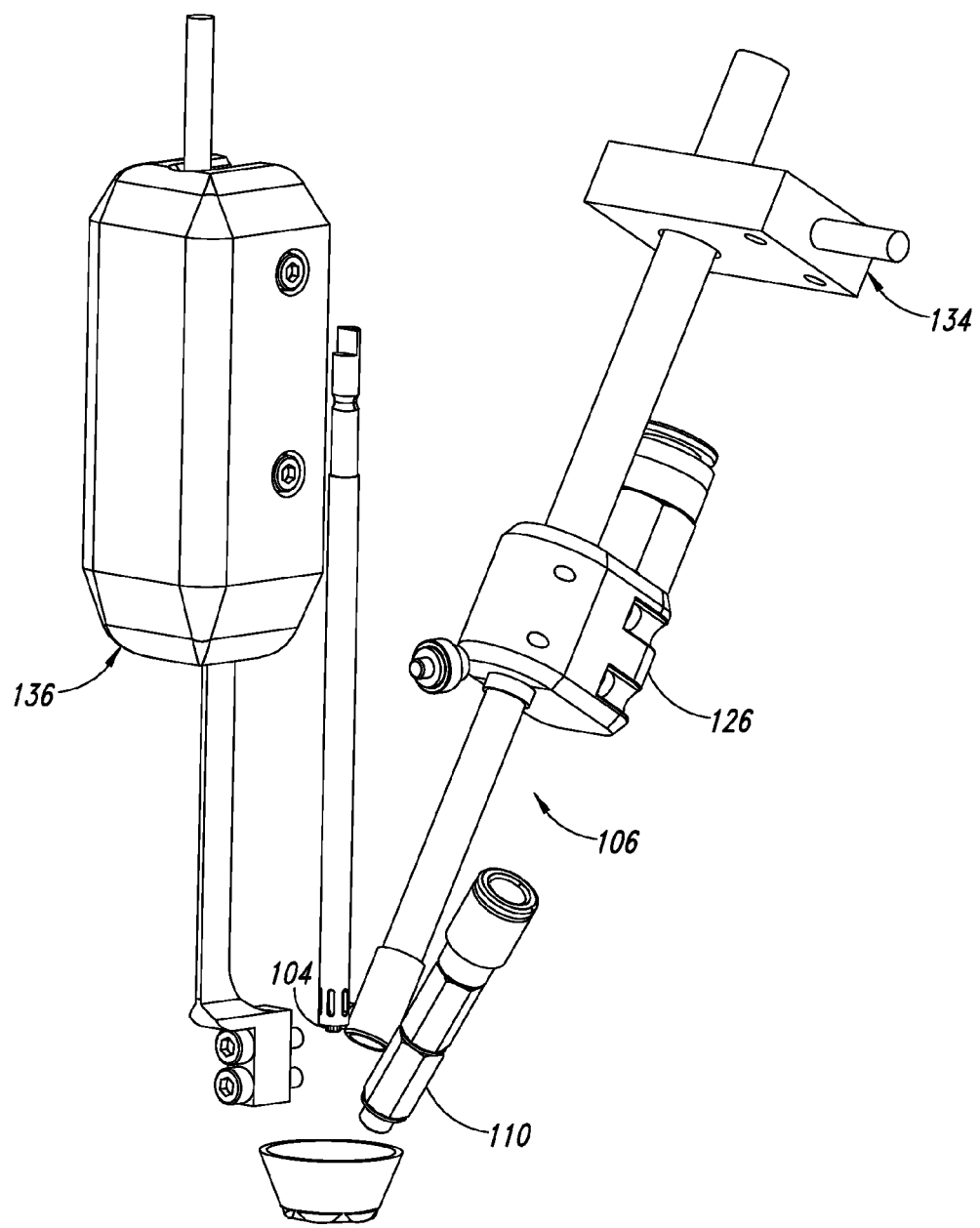
FIG. 5 is a detailed perspective view of the electric screwdriver and the automatic screw feeding adaptor of FIG. 3 with a body portion of the electric screwdriver removed, according to one illustrated embodiment.

FIGS. 3 and 4 are enlarged perspective and exploded views, respectively, of the electric screwdriver 102 and the automatic screw feeding adaptor 106. As illustrated, the electric screwdriver 102 includes a housing 133. FIG. 5 is a detailed perspective view of the electric screwdriver 102 and the automatic screw feeding adaptor 106 with the housing 133 of the electric screwdriver 102 removed to show the bit 104. In one embodiment, as illustrated, the electric screwdriver assembly 100 includes a screw detector 134 coupled to the screw feeding adaptor 106. The screw detector 134 may be configured to detect the passage of a screw 118 along the screw path 108 (e.g., using a capacitance measurement), and may be positioned at a variety of locations along the screw path 108. The presence of the screw 118 may be used in one or more control algorithms during the screw driving process. Thus, in one embodiment, the screw detector 134 may be coupled to the controller 116 and may be configured to send a signal to the controller 116 indicative of the presence of a screw 118.

The electric screwdriver assembly 100 may further include a bit detector 136 configured to detect if the bit 104 of the electric screwdriver 102 is out of the screw path 108. The bit detector 136 may comprise any of a variety of sensors configured to detect and indicate a position of the bit 104. The bit detector 136 may be coupled to the controller 116, and the controller 116 may be operable to receive bit position information indicative of the bit 104 of the electric screwdriver 102 being out of the screw path 108. This bit position information may then be used in order to determine when to drop a screw 118 towards the distal end 108c of the screw path 108 (through which the bit 104 passes during a driving operation). In other embodiments, the bit position information may be used in other ways during the screw driving process.

FIG. 4 provides a more detailed illustration of the buffer position and the driving position, wherein screws 118 may be held via a middle partial vacuum and a distal partial vacuum, respectively. With respect to the buffer position, the middle vacuum coupling assembly 126 may be positioned to surround a middle perforated region 138 in the screw feeder tube 122. When a vacuum is applied to the middle vacuum coupling assembly 126, a screw 118 may be held at the buffer position, near the center of this middle perforated region 138. Similarly, with respect to the driving position, the distal vacuum coupling assembly 110 may be positioned to surround a distal perforated region 140 in the distal screw conduit 123. When a vacuum is applied to the distal vacuum coupling assembly 110, a screw 118 may be held at the driving position, near the center of this distal perforated region 140.

Figure 6:
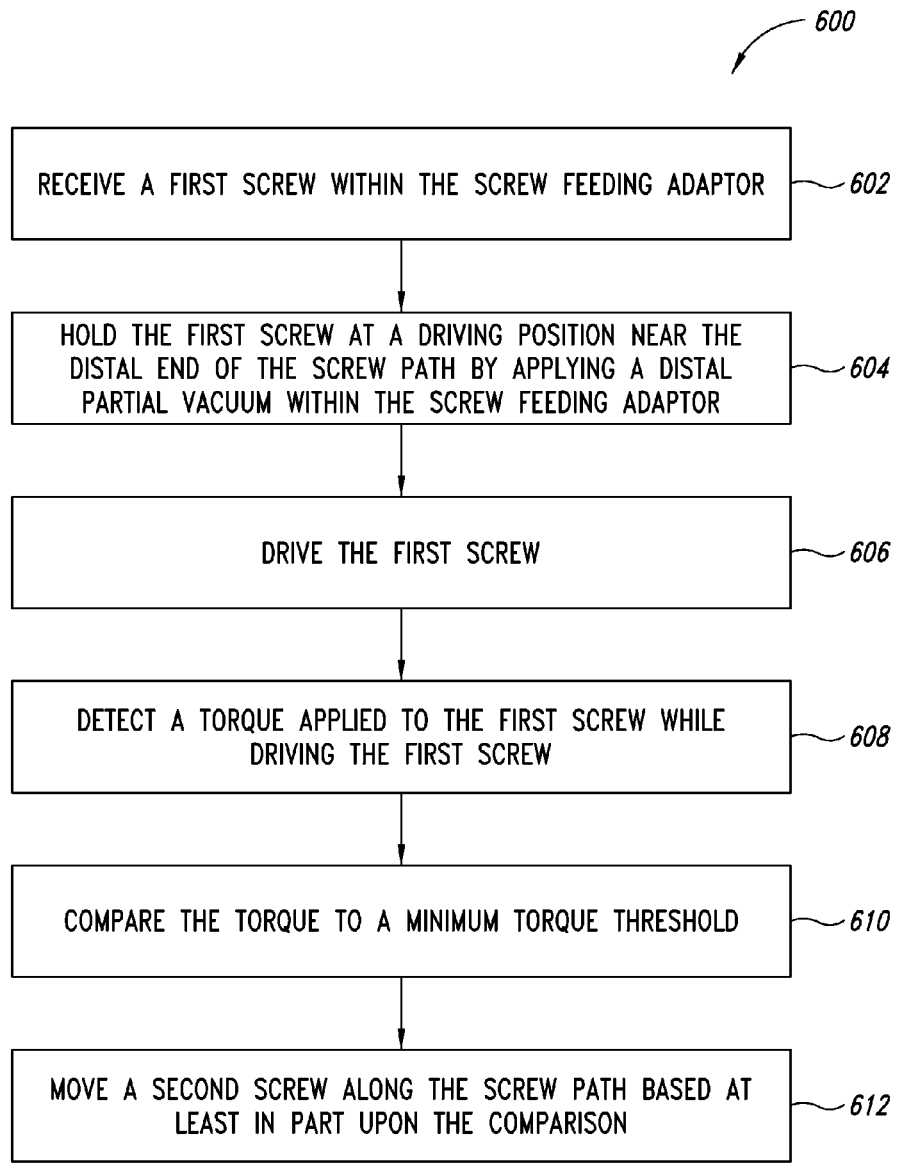
FIG. 6 illustrates a flow chart for a method of driving screws, according to one illustrated embodiment.

FIG. 6 illustrates a flow chart for a method 600 of driving screws, according to one illustrated embodiment. This method 600 will be discussed in the context of the electric screwdriver assembly 100 illustrated in FIGS. 1-5 and 8 and with reference to the series of FIGS. 9A-K. However, the acts disclosed herein may be executed using a variety of screw driving equipment, in accordance with the described method.

As described herein, at least some of the acts comprising the method 600 may be orchestrated by one or more controllers according to an automatic screw driving algorithm. In one embodiment, the one or more controllers may be programmed using computer-readable instructions stored in computer-readable memory that are executed by a processor. A hardware implementation of one or more acts of the method 600 may also be employed, in other embodiments.

Figure 8:
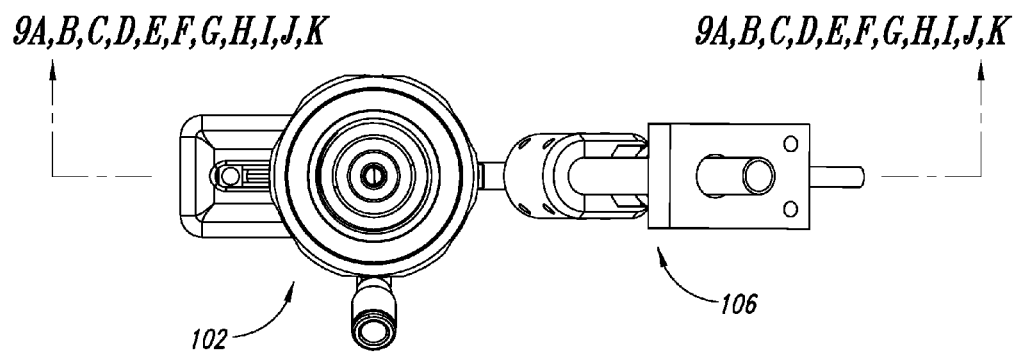
FIG. 8 is a top view of the electric screwdriver and the automatic screw feeding adaptor of FIG. 3, according to one illustrated embodiment.

FIG. 8 illustrates a top view of the electric screwdriver 102 and the automatic screw feeding adaptor 106, from which the cross-sectional views of FIGS. 9A-K are taken. These cross-sectional views illustrate the electric screwdriver 102 and the automatic screw feeding adaptor 106 with screws 118 at various locations during a screw driving process.

Figure 9A:
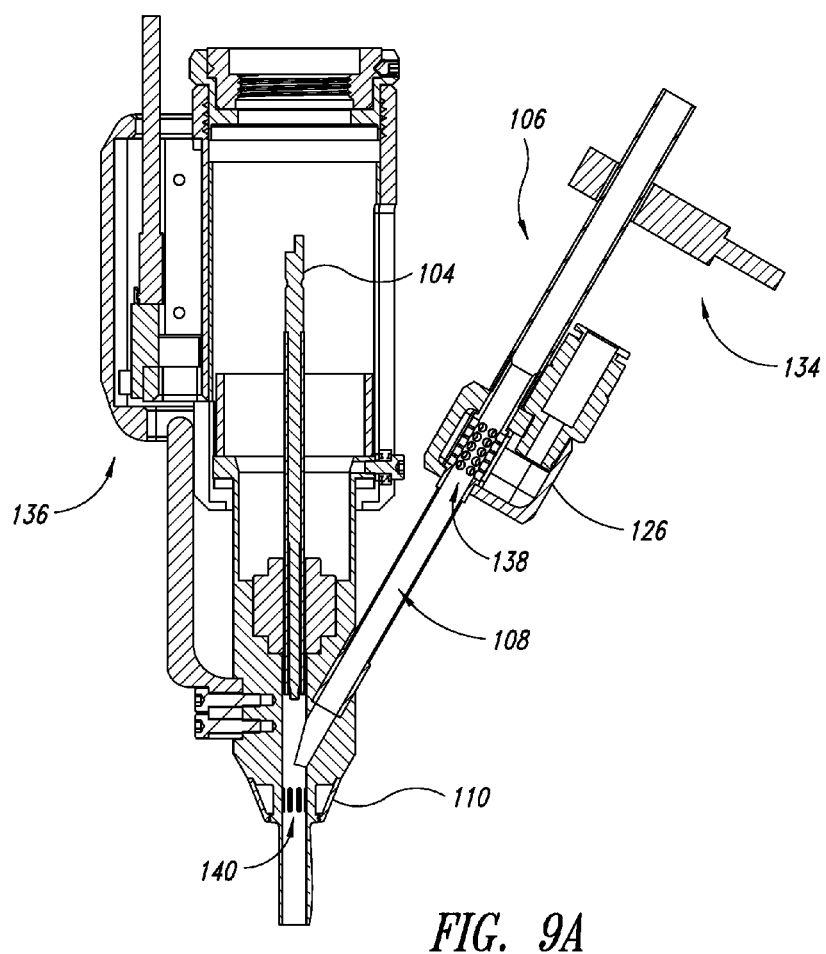
FIG. 9A is a cross-sectional view of the electric screwdriver and the automatic screw feeding adaptor of FIG. 3, according to one illustrated embodiment.
Figure 9B:
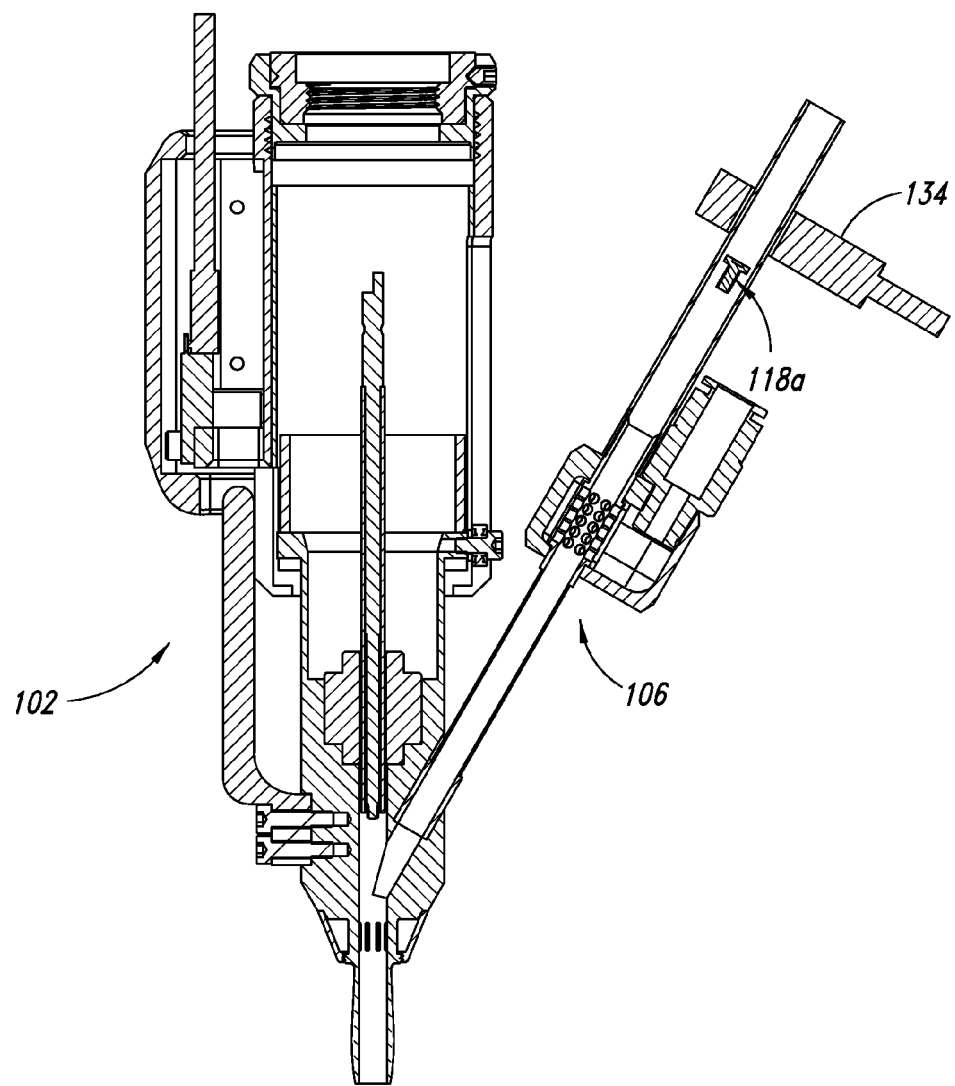
FIG. 9B is a cross-sectional view of the electric screwdriver and the automatic screw feeding adaptor of FIG. 3 with a first screw near a proximal end of a screw path, according to one illustrated embodiment.

At act 602, a first screw 118a is received within a screw feeding adaptor 106. FIG. 9A illustrates a cross-sectional view of the screw feeding adaptor 106 without any screws along the screw path 108, while FIG. 9B illustrates the first screw 118a advancing through a proximal portion of the screw path 108. The first screw 118a may be received from a variety of dispensing locations. In one embodiment, a screw feeder 124 may hold a plurality of screws 118 and may dispense them one at a time. These screws 118 may then drop under the force of gravity along the screw path 108 within the screw feeding adaptor 106. In another embodiment, the first screw 118a may be drawn into the screw path 108 by a partial vacuum generated within the screw path 108. In other embodiments, other structures for dispensing the first screw 118a may be used.

The controller 116 may be coupled to the screw feeder 124 and may send a signal to the screw feeder 124 causing the screw feeder 124 to release the first screw 118a. In another embodiment, a separate controller or other computing device may control the screw feeder 124. In yet another embodiment, the screw feeder 124 may be autonomous and may release the screws 118 according to its own algorithm.

The first screw 118a may trigger the screw detector 134 as it passes by along the screw path 108. This trigger may be used by the controller 116, for example, to indicate that the first screw 118a has indeed been received within the screw feeding adaptor 106, and is now traveling along the screw path 108. In other embodiments, the screw feeder 124 itself may have some integrated structure for verifying that the first screw 118a has been dispensed into the screw feeding adaptor 106.

Figure 9C:
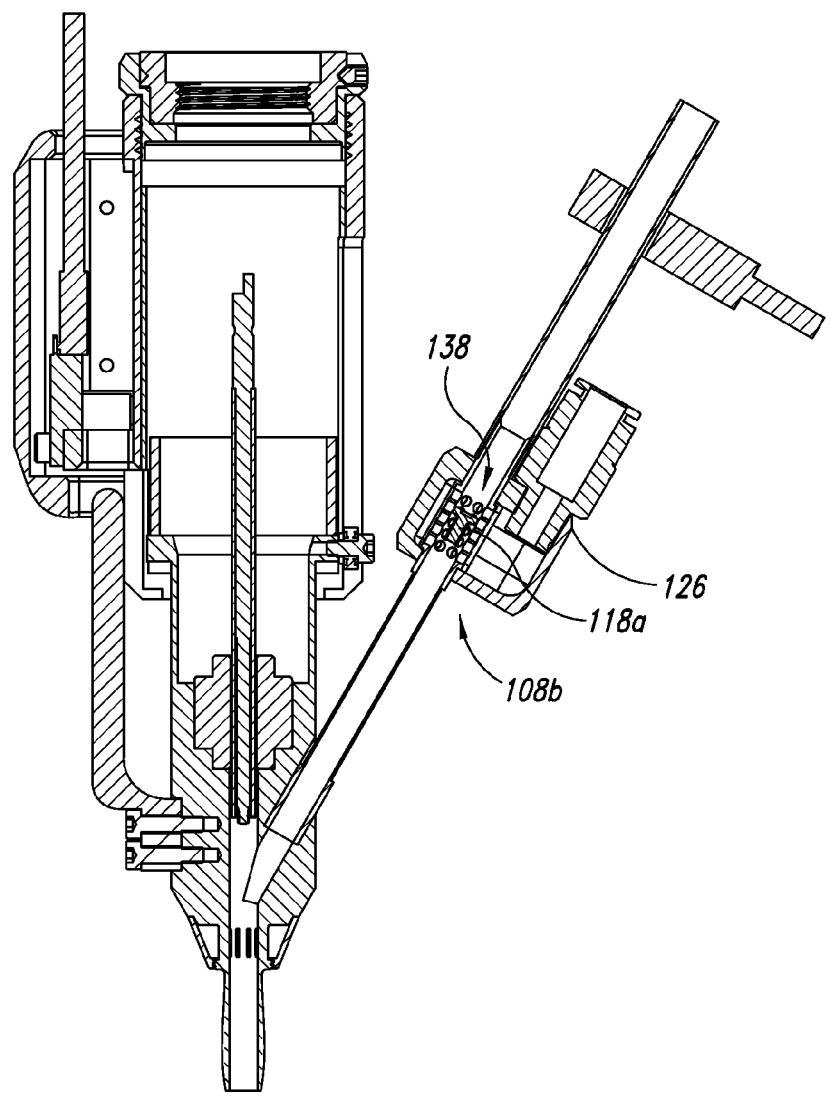
FIG. 9C is a cross-sectional view of the electric screwdriver and the automatic screw feeding adaptor of FIG. 3 with the first screw at a buffer position, according to one illustrated embodiment.

In one embodiment, as illustrated in FIG. 9C, the first screw 118a may be held at a buffer position in the middle region 108b by applying a middle partial vacuum within the screw feeding adaptor 106 before the first screw 118a is held at a driving position. As illustrated, the middle partial vacuum may be generated in the middle perforated region 138 via the middle vacuum coupling assembly 126, which may, in turn, be coupled to a second vacuum generator 128 (not shown in FIG. 9C). As described above, in one embodiment, the controller 116 may be configured to control the middle partial vacuum and to hold the first screw 118a at the buffer position. Of course, in some embodiments, the first screw 118a may be held by different mechanisms at the buffer position. Indeed, in other embodiments, there may be no such buffer position, and the first screw 118a may fall straight through the middle region 108b to the driving position near the distal end 108c of the screw path 108. In such embodiments, the electric screwdriver assembly 100 may also lack a middle vacuum coupling assembly 126, as well as the co-located middle perforated region 138.

Figure 9D:
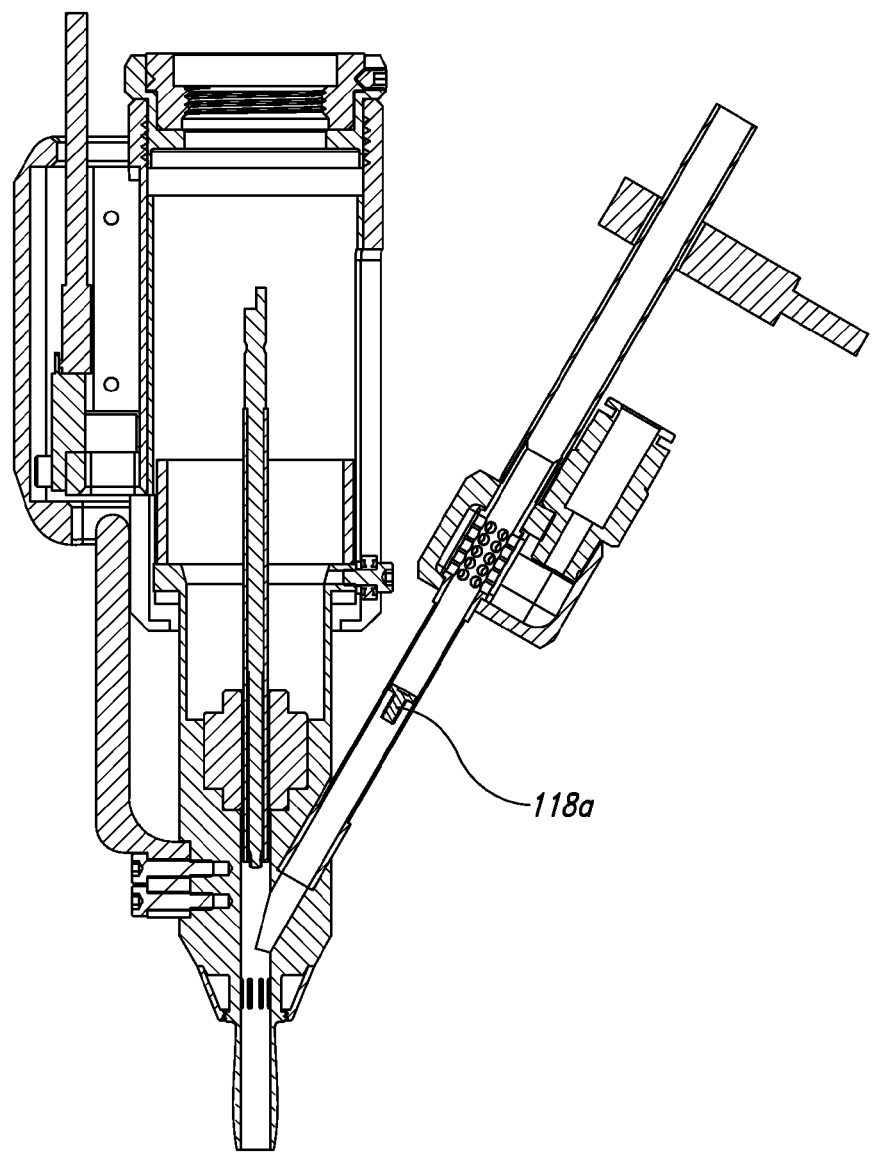
FIG. 9D is a cross-sectional view of the electric screwdriver and the automatic screw feeding adaptor of FIG. 3 with the first screw leaving the buffer position and traveling towards a distal end of the screw path, according to one illustrated embodiment.
Figure 9E:
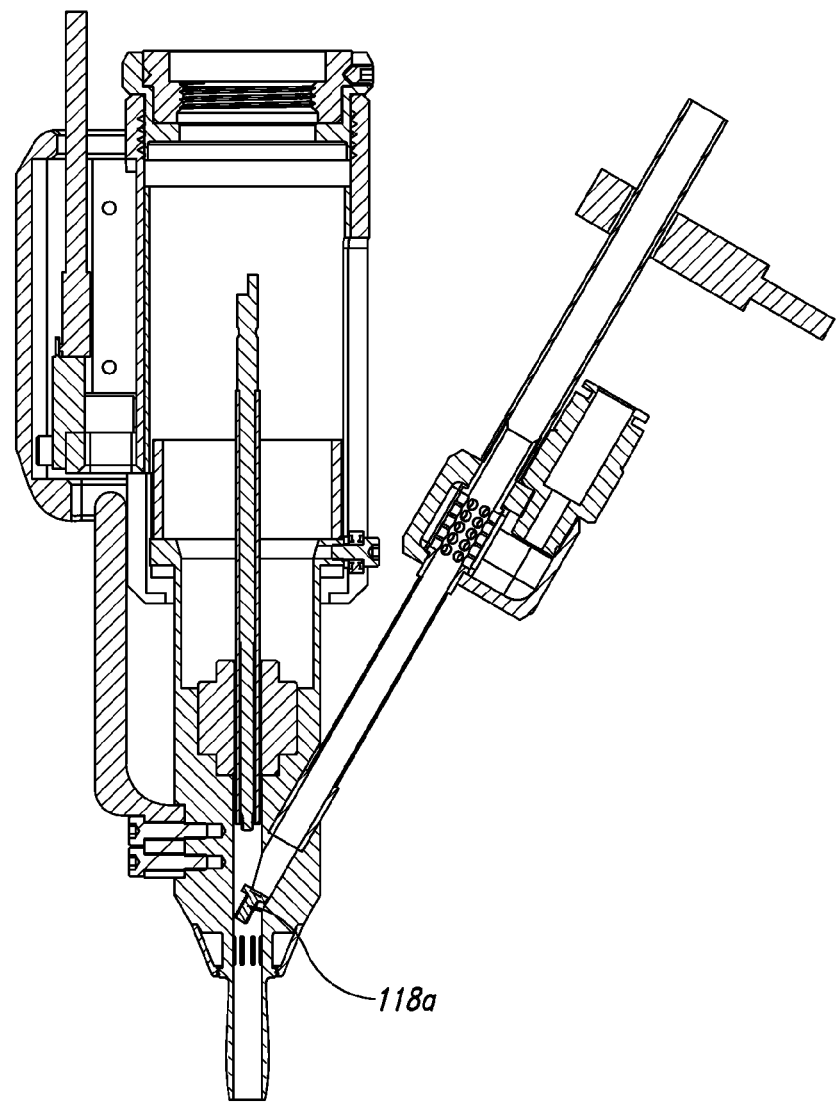
FIG. 9E is a cross-sectional view of the electric screwdriver and the automatic screw feeding adaptor of FIG. 3 with the first screw near the distal end of the screw path, according to one illustrated embodiment.

In an embodiment in which the first screw 118a is held at the buffer position, the middle partial vacuum may be lessened, and the first screw 118a allowed to drop from the buffer position to a driving position (FIGS. 9D and 9E illustrate a path of the first screw 118a traveling between these two positions). In one embodiment, the middle partial vacuum may be completely shut off. However, in other embodiments, the middle partial vacuum may only be lessened sufficiently to allow the first screw 118a to fall beyond the middle perforated region 138 towards the distal end 108c of the path 108. As described above, in one embodiment, the controller 116 may control the second vacuum generator 128 (or one or more valves coupled to the second vacuum generator 128) in order to lessen the middle partial vacuum.

Figure 9F:
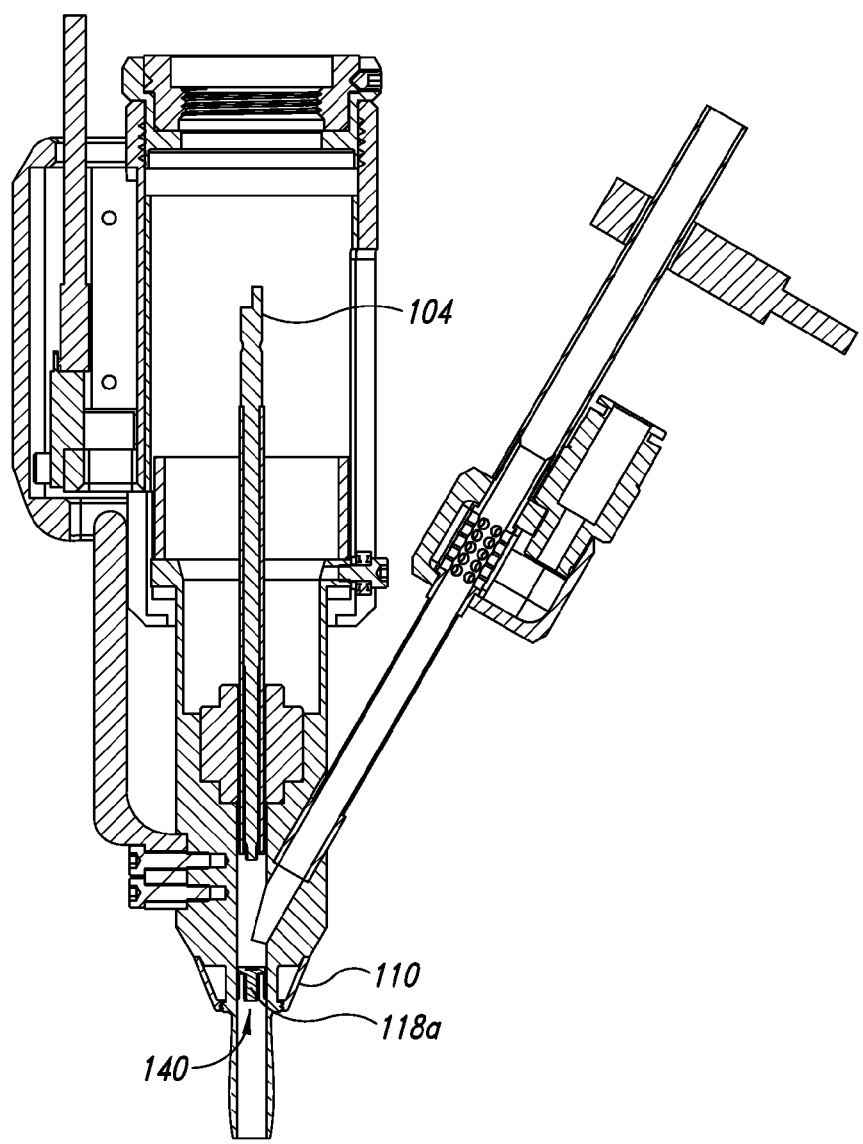
FIG. 9F is a cross-sectional view of the electric screwdriver and the automatic screw feeding adaptor of FIG. 3 with the first screw at a driving position, according to one illustrated embodiment.

At act 604, the first screw 118a is held at a driving position near the distal end 108c of the screw path 108 by applying a distal partial vacuum within the screw feeding adaptor 106. This driving position is illustrated in FIG. 9F. As illustrated, the distal partial vacuum may be generated in the distal perforated region 140 via the distal vacuum coupling assembly 110, which may, in turn, be coupled to a vacuum generator 112. Of course, in different embodiments, the first screw 118a may be held by other structures at the driving position. In one embodiment, the controller 116 may be configured to control the distal partial vacuum by controlling the vacuum generator 112 (or one or more valves coupled to the vacuum generator 112). However, in other embodiments, the distal partial vacuum may be "always on" during operation of the electric screwdriver assembly 100.

In one embodiment, the distal partial vacuum may generate a force on the first screw 118a that is sufficient to arrest the fall of the first screw 118a and to hold the first screw 118a at or near the distal perforated region 140. The first screw 118a may be held in a position roughly aligned with the openings in the distal perforated region 140. In this position, the first screw 118a may be oriented suitably for engagement by the bit 104 of the screwdriver 102.

Figure 9G:
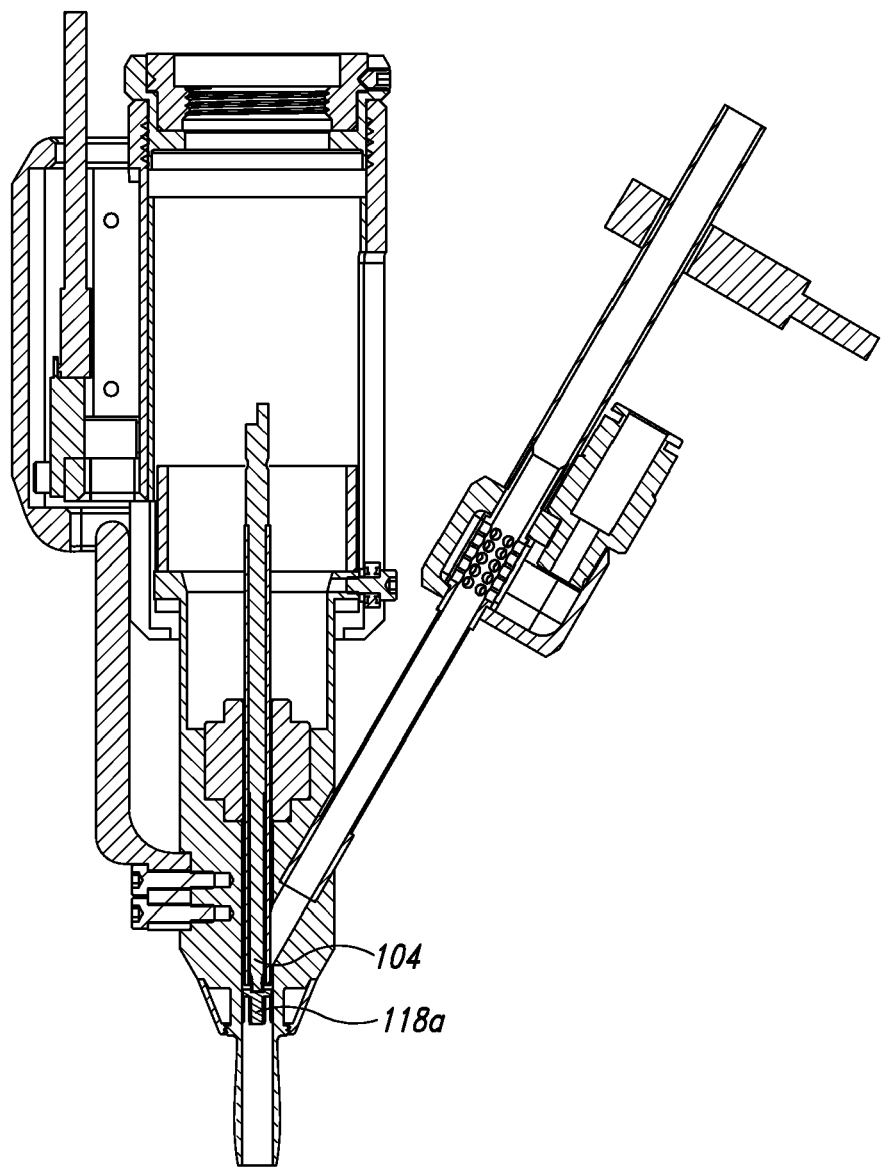
FIG. 9G is a cross-sectional view of the electric screwdriver and the automatic screw feeding adaptor of FIG. 3 with the first screw engaged by a bit of the electric screwdriver at the driving position, according to one illustrated embodiment.
Figures 9H, 10:
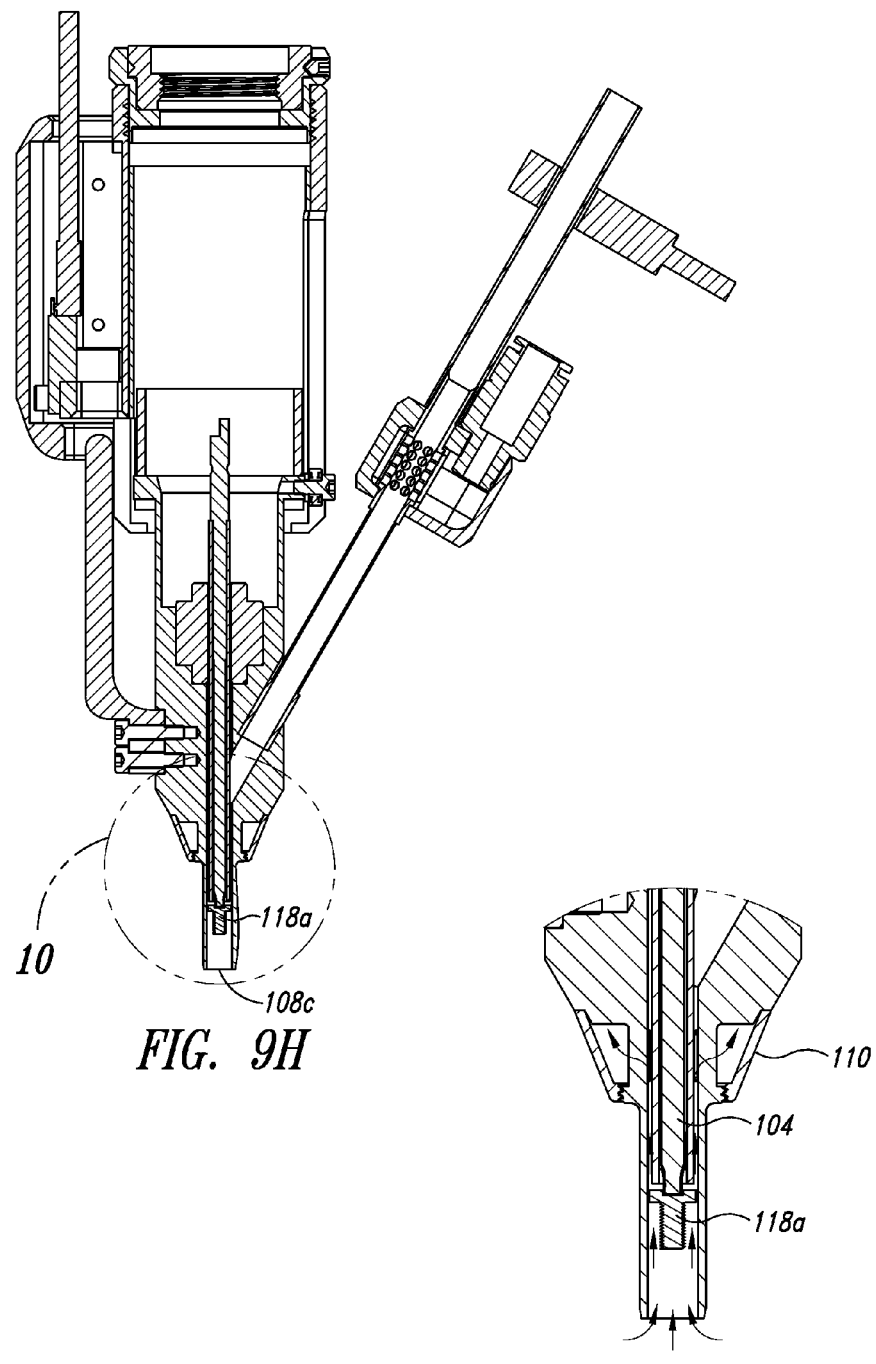
FIG. 9H is a cross-sectional view of the electric screwdriver and the automatic screw feeding adaptor of FIG. 3 with the first screw being pushed beyond the driving position towards the distal end of the screw path, according to one illustrated embodiment.
FIG. 10 is an enlarged, cross-sectional view of the bit of the electric screwdriver engaging the first screw as illustrated in FIG. 9H, according to one illustrated embodiment.

At act 606, the first screw 118a is driven. As illustrated in FIG. 9G, the bit 104 of the screwdriver 102 may be advanced within the electric screwdriver assembly 100 to engage the first screw 118a, while the first screw 118a is held at the driving position. The distal partial vacuum may then be maintained as the bit 104 engages the first screw 118a and pushes it towards the distal end 108c of the screw path 108 (as illustrated in FIG. 9H). In the enlarged view of FIG. 10, the airflow generated by the distal partial vacuum within the screw feeding adaptor 106 is conceptually illustrated. This airflow may tend to push the first screw 118a proximally against the bit 104 during the engagement and driving of the first screw 118a. The first screw 118a may then be pushed out from the screw feeding adaptor 106 by the bit 104 in order to be driven into a workpiece (not shown in FIG. 9H).

In one embodiment, a separate screwdriver controller 130 may control this screw driving process. However, in other embodiments, the controller 116 may also be involved. Any of a number of algorithms may be used to determine how far and how rapidly to drive the first screw 118a.

At act 608, a torque applied to the first screw 118a while driving the first screw 118a is detected. As described above, the electric screwdriver assembly 100 may include a torque sensor 114 configured to detect a torque applied by the electric screwdriver 102. In one embodiment, the torque applied to the first screw 118a may be detected in order to determine when the first screw 118a has been successfully driven into a workpiece 120. For example, the torque applied to the first screw 118a may exceed a minimum torque threshold once the first screw 118a has been successfully driven. This minimum torque threshold may be theoretically or empirically derived. In some embodiments, other characteristics of the screw driving process may also be detected. For example, in one embodiment, a number of revolutions performed by the bit 104 while driving the first screw 118a may be measured. In another embodiment, a vertical distance traveled by the bit 104 may be measured.

At act 610, the torque is compared to a minimum torque threshold. In one embodiment, the torque may be detected and compared to the minimum torque threshold within the torque sensor 114 or within the electric screwdriver 102. In another embodiment, a signal indicative of the torque may be sent to the controller 116, which may then compare the torque against the minimum torque threshold. As described above, the minimum torque threshold may be associated with a successful screw driving process. In other embodiments, the minimum torque threshold may simply indicate that the first screw 118a is sufficiently engaged with a workpiece 120, such that, when the bit 104 is retracted, the first screw 118a will not follow the bit 104 back along the screw path 108. For example, the minimum torque threshold may be exceeded even if the first screw 118a is cross-threaded in the workpiece 120 and has not been successfully driven. As another example, during a successful screw driving process, the minimum torque threshold may represent a lower threshold that is exceeded before the first screw 118a has been completely and successfully driven into the workpiece 120.

At act 612, a second screw 118b is moved along the screw path 108 based at least in part upon the comparison. In one embodiment, for example, the second screw 118b is moved along the screw path 108 based at least in part upon the torque exceeding the minimum torque threshold. The second screw 118b may be moved along different portions of the screw path 108 in a variety of ways based upon the comparison between the torque and the minimum torque threshold. As described above, the controller 116 may orchestrate the movement of the second screw 118b based at least in part upon the comparison.

Figure 9I:
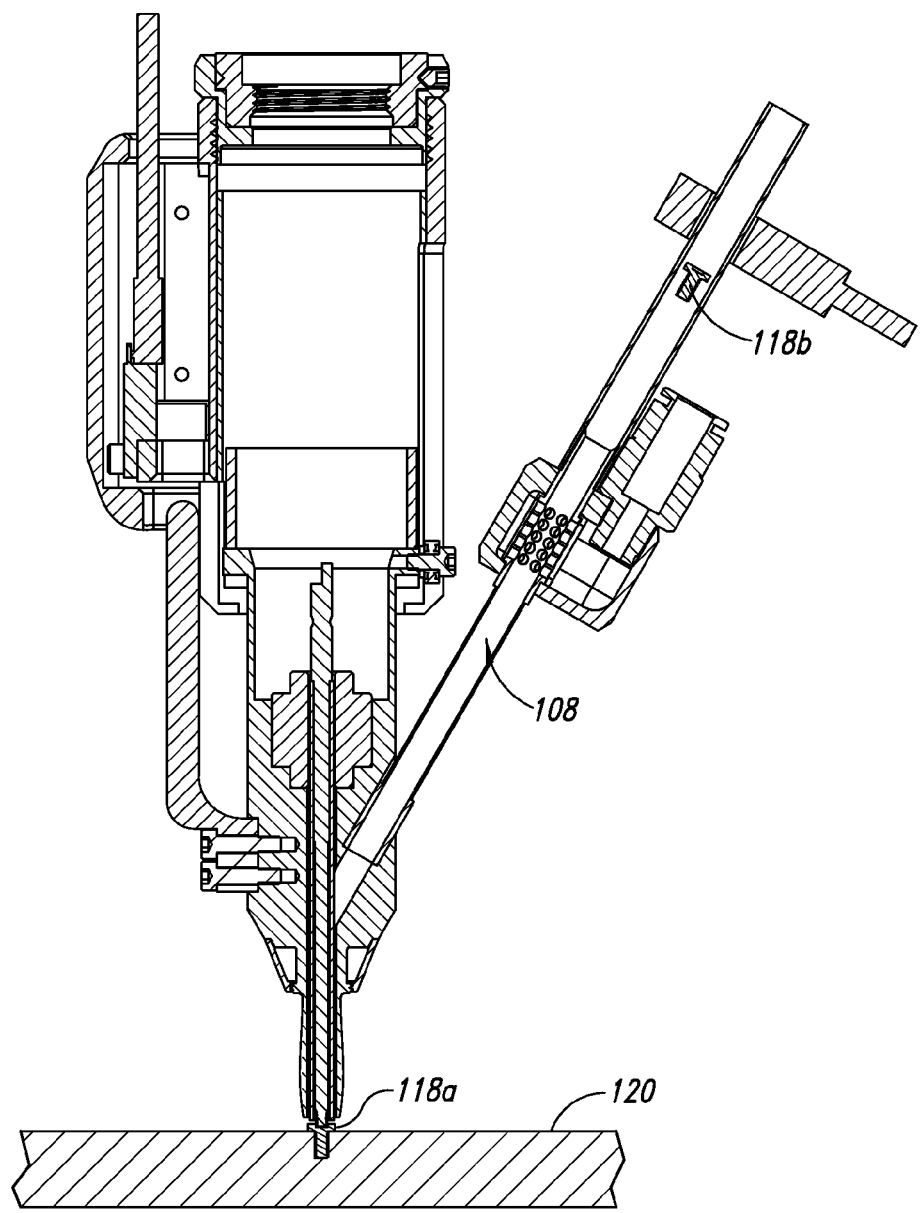
FIG. 9I is a cross-sectional view of the electric screwdriver and the automatic screw feeding adaptor of FIG. 3 with the first screw being driven into a workpiece, and a second screw near the proximal end of the screw path, according to one illustrated embodiment.
Figure 9J:
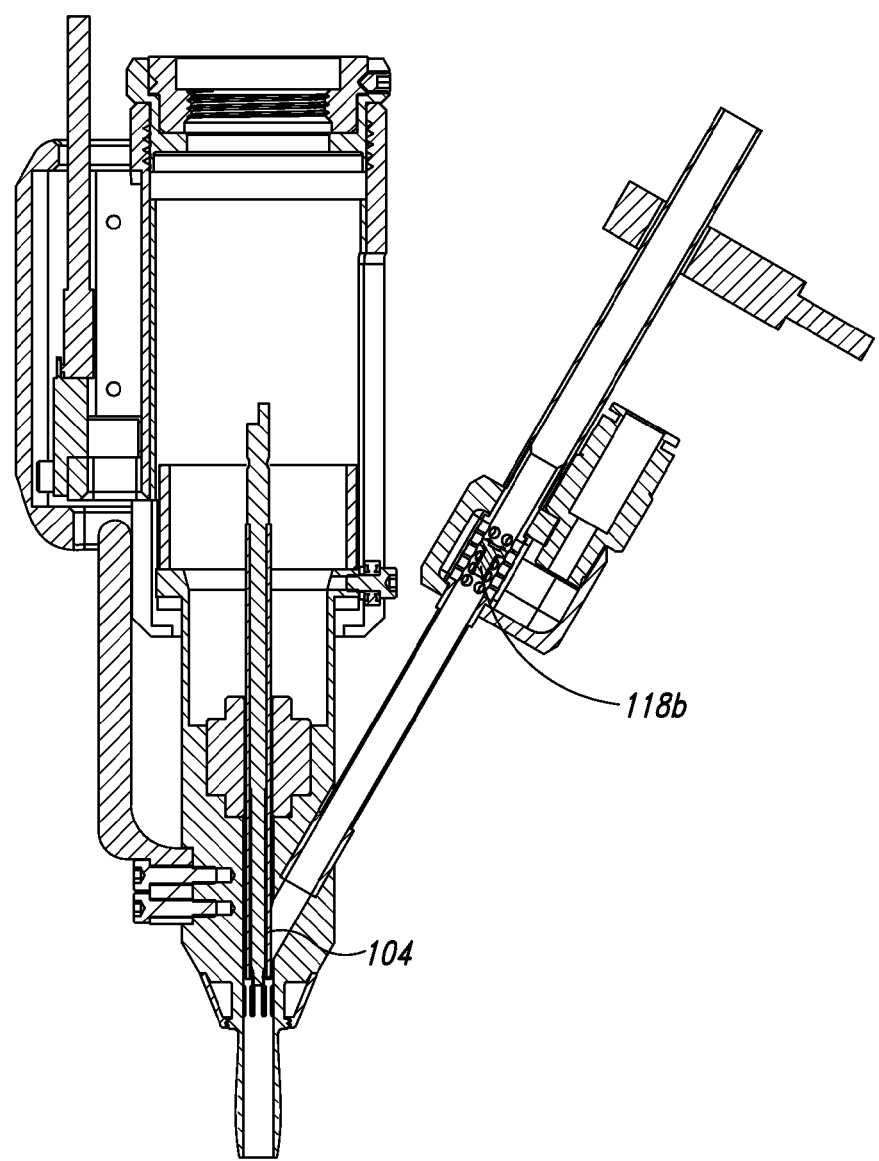
FIG. 9J is a cross-sectional view of the electric screwdriver and the automatic screw feeding adaptor of FIG. 3 with the second screw at the buffer position and the bit of the screwdriver in the screw path, according to one illustrated embodiment.

In one embodiment, as illustrated in FIGS. 9I and 9J, the second screw 118b may be allowed to drop to the buffer position based at least in part upon the torque exceeding the minimum torque threshold. The second screw 118b may then be held at the buffer position by applying the middle partial vacuum (see FIG. 9J). Meanwhile, after driving the first screw 118a, the bit 104 may withdraw proximally from a distal portion of the screw path 108, as illustrated in FIG. 9J.

Figure 9K:
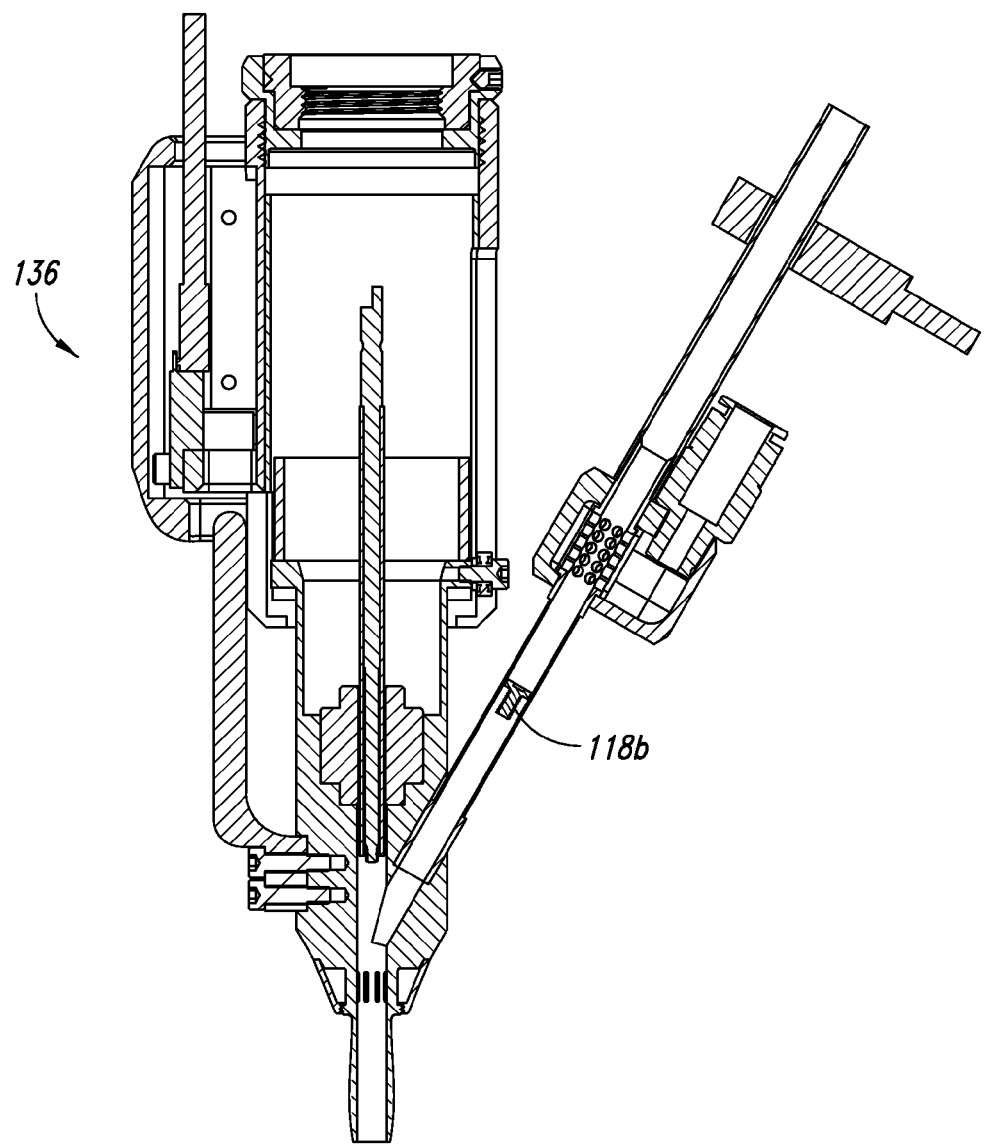
FIG. 9K is a cross-sectional view of the electric screwdriver and the automatic screw feeding adaptor of FIG. 3 with the second screw leaving the buffer position and traveling towards the distal end of the screw path, according to one illustrated embodiment.

In one embodiment, while the second screw 118b is being held at the buffer position, it may be determined that the bit 104 is out of the screw path 108 (as illustrated in FIG. 9K). As described above, the electric screwdriver assembly 100 may include a bit detector 136 configured to detect a location of the bit 104 relative to the screw path 108. The bit detector 136 may be coupled to the controller 116, and the controller 116 may receive bit position information indicative of the bit 104 being out of the screw path 108 from the bit detector 136. The middle partial vacuum may be lessened and the second screw 118b allowed to drop from the buffer position to the driving position based at least in part on determining that the bit 104 of the electric screwdriver 102 is out of the screw path 108. The second screw 118b may then be held at the driving position by applying the distal partial vacuum within the screw feeding adaptor 106 (e.g., in a manner similar to that used to hold the first screw 118a at the driving position).

In another embodiment, the second screw 118b may be moved along a different portion of the screw path 108 based at least in part upon the comparison between the torque and the minimum torque threshold. For example, the second screw 118b may be moved to the buffer position at any point after the first screw 118a has moved beyond the buffer position (e.g., when the first screw 118a is positioned as illustrated in FIGS. 9D-H). Moving the second screw 118b to the buffer position may thus be independent of the torque applied by the bit 104 or detection of the location of the bit 104. Once the second screw 118b has been moved to the buffer position, the second screw 118b may then be held at the buffer position by applying the middle partial vacuum. The second screw 118b may continue to be held at the buffer position while driving the first screw 118a.

In one embodiment, the second screw 118b is then moved along the screw path 108 by lessening the middle partial vacuum and allowing the second screw 118b to drop from the buffer position to the driving position based at least in part upon the comparison of the torque to the minimum torque threshold. In one embodiment, it may also be determined that the bit 104 of the electric screwdriver 102 is out of the screw path 108, and the second screw 118b may be dropped from the buffer position to the driving position based at least in part on determining that the bit 104 of the electric screwdriver 102 is out of the screw path 108. In such an embodiment, the second screw 118b may be advanced from the buffer position only if both the torque exceeds the minimum torque threshold and the bit 104 is out of the screw path 108.

In yet another embodiment, the second screw 118b may be moved along a different portion of the screw path 108 based at least in part upon the comparison between the torque and the minimum torque threshold. For example, the second screw 118b may be allowed to drop to the driving position near the distal end 108c of the screw path 108 based at least in part on the comparison of the torque to the minimum torque threshold, without first being held at a buffer position. In some embodiments, the electric screwdriver assembly 100 may lack a middle vacuum coupling assembly, and the second screw 118b may be released from the screw feeder 124 to the driving position based at least in part on the comparison of the torque to the minimum torque threshold. It may also be determined that the bit 104 of the electric screwdriver 102 is out of the screw path 108, and the second screw 118b may be allowed to drop to the driving position further based at least in part on determining that the bit 104 is out of the screw path 108. Thus, in one embodiment, the second screw 118b may be dropped to the driving position only if both the torque exceeds the minimum torque threshold and the bit 104 is out of the screw path 108.

Once the second screw 118b has been dropped to the driving position, the second screw 118b may be held at the driving position near the distal end 108c by applying the distal partial vacuum within the screw feeding adaptor 106. In one embodiment, the second screw 118b may then be driven, and a torque applied to the second screw 118b may be detected while driving the second screw 118b. The torque may then be compared to the minimum torque threshold. If the torque exceeds the minimum torque threshold, the screw driving process may continue with additional screws 118 in a manner similar to that described above. In another embodiment, if the torque does not exceed the minimum torque threshold, the second screw 118b may be re-driven. The torque applied to the second screw 118b may again be detected while re-driving the second screw 118b, and again compared to the minimum torque threshold. An error may be generated if the torque during the re-driving process also does not exceed the minimum torque threshold. That is, after re-driving the second screw 118b unsuccessfully, an error may be generated, indicating that the second screw 118b could not be driven successfully. In other embodiments, two or more re-driving attempts may be made before an error is generated. The generated error may signal an operator that the second screw 118b should be manually removed from the electric screwdriver assembly 100 before continuing screw driving operations.

In some embodiments, other characteristics of the screw driving process may also be used in order to move the second screw 118b along the screw path 108. For example, in one embodiment, the second screw 118b may be moved along the screw path 108 based at least in part upon a number of revolutions performed by the bit 104 while driving the first screw 118a. In another embodiment, the second screw 118b may be moved along the screw path 108 based at least in part upon a vertical distance traveled by the bit 104 while driving the first screw 118a.

Figure 7A:
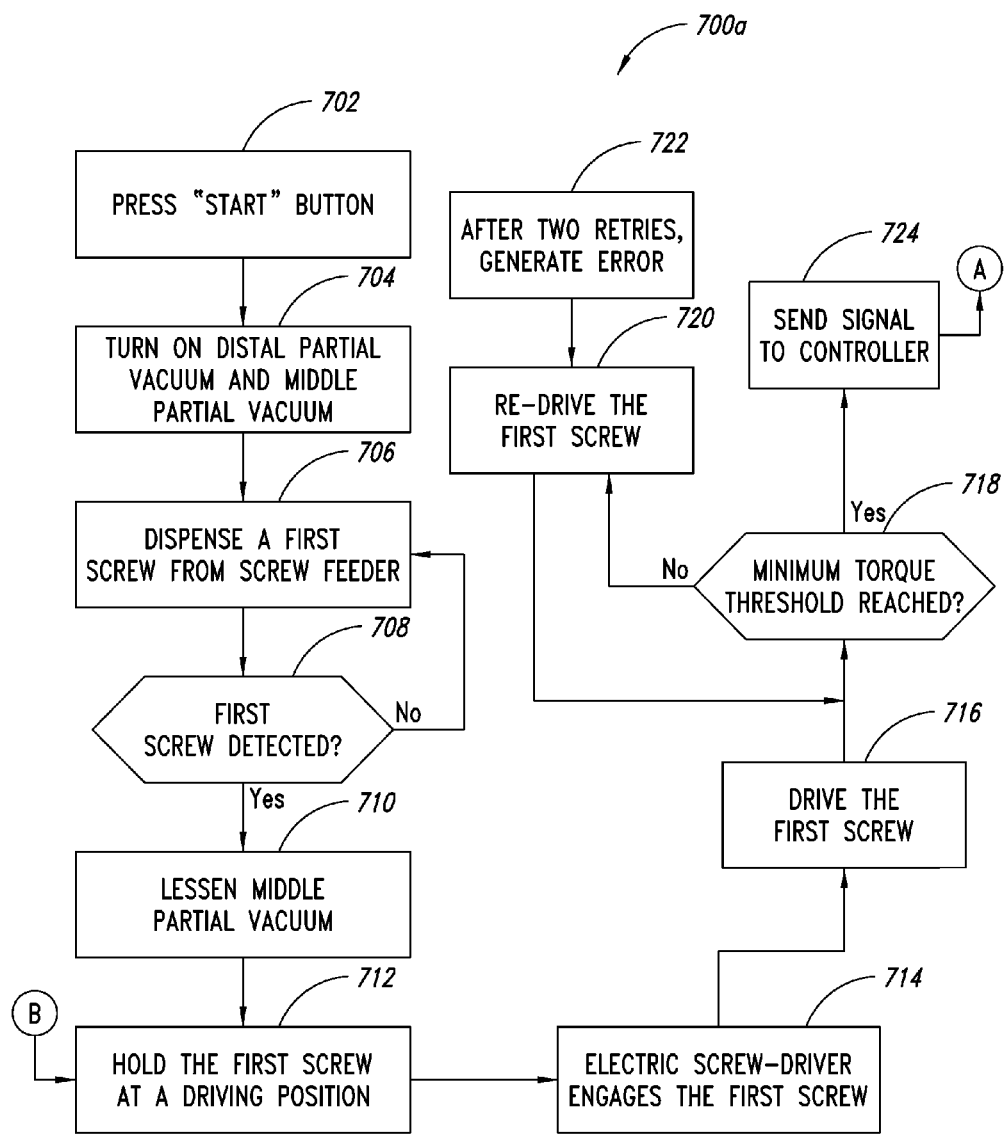
FIG. 7A illustrates a first part of a more detailed flow chart for a method of driving screws, according to one illustrated embodiment.
Figure 7B:
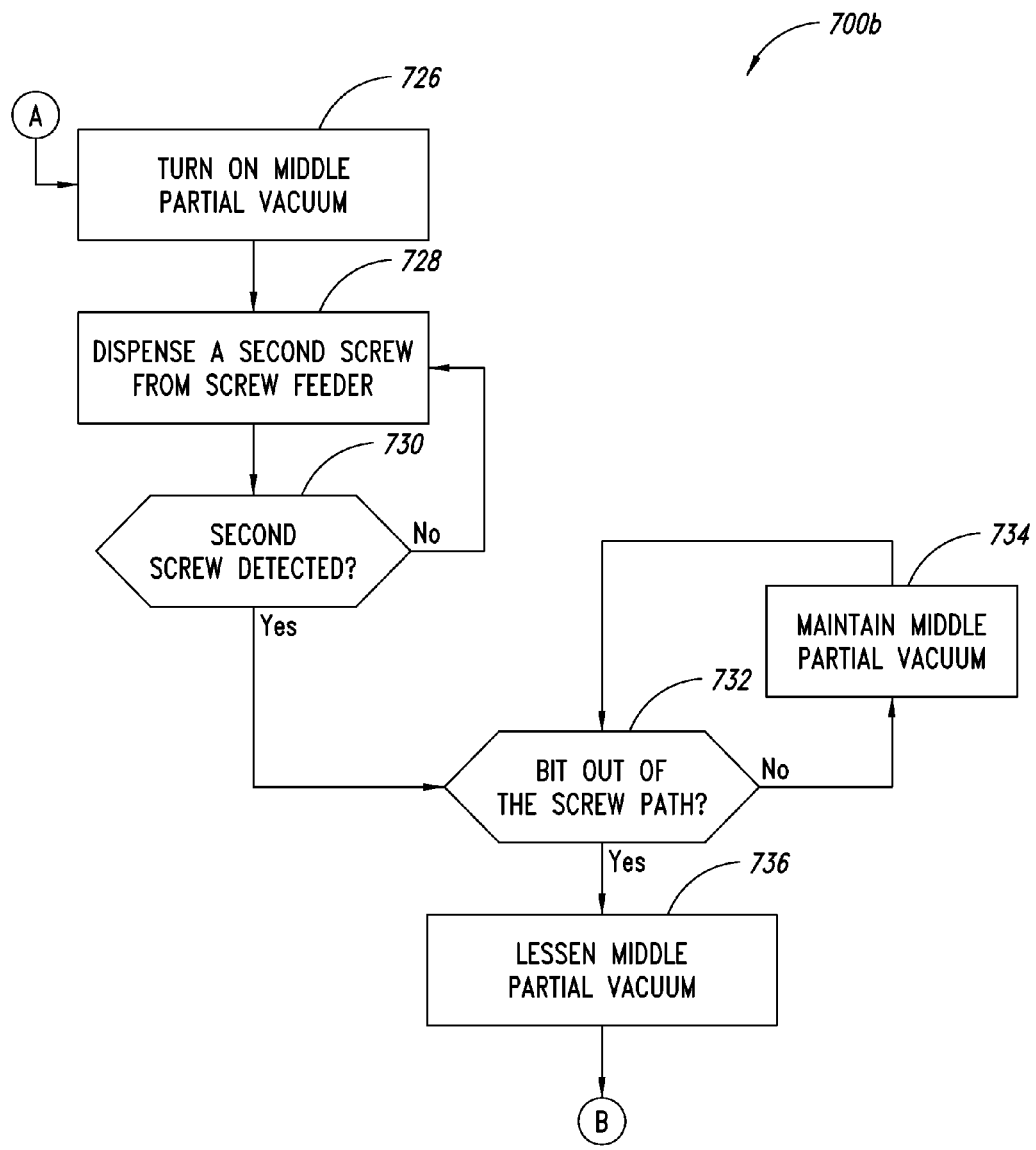
FIG. 7B illustrates a second part of the method illustrated in FIG. 7A, according to one illustrated embodiment.
Figure 7C:
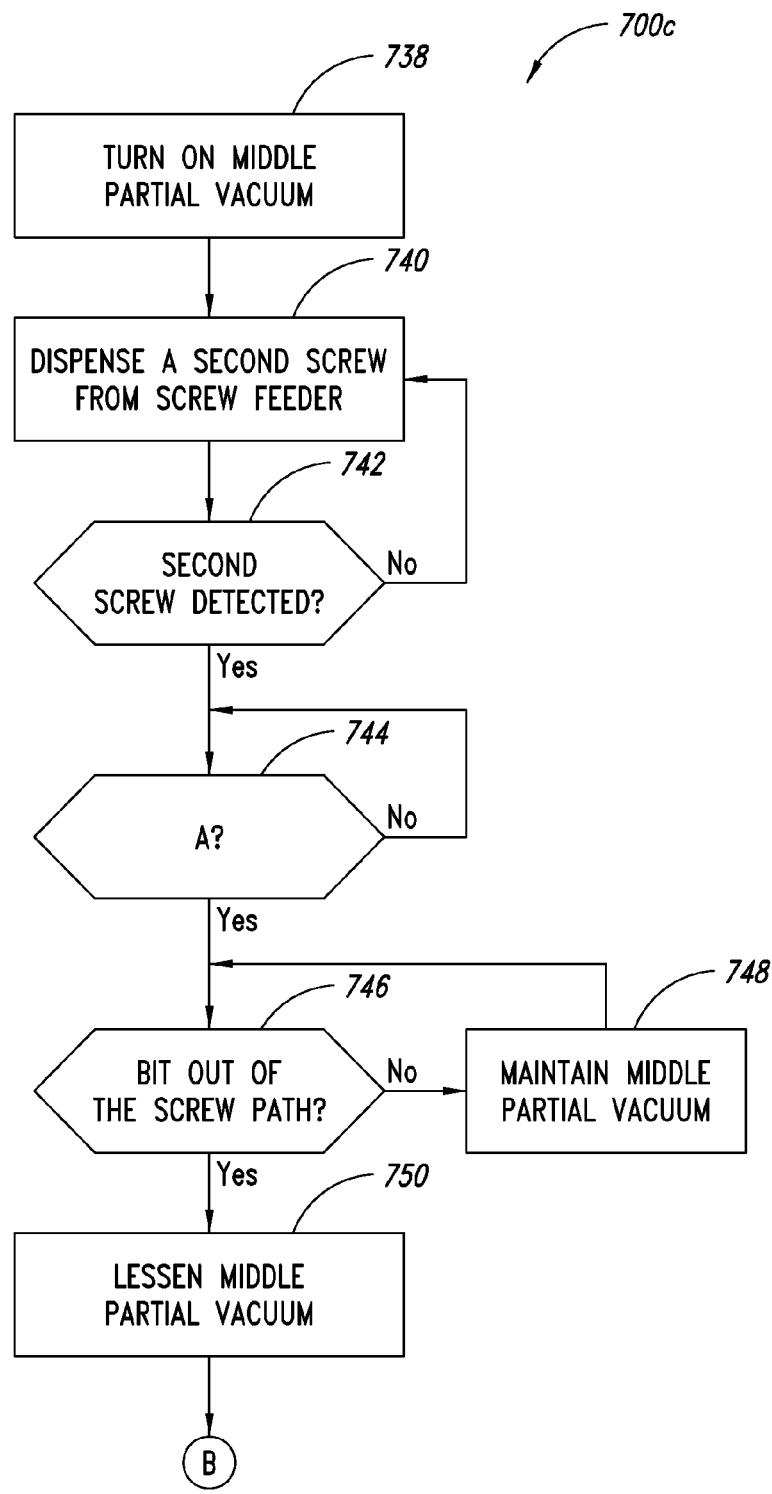
FIG. 7C illustrates an alternative second part of the method illustrated in FIG. 7A, according to one illustrated embodiment.

FIGS. 7A and 7B illustrate a more detailed flow chart for a method of driving screws, according to one illustrated embodiment. FIGS. 7A and 7C combine to illustrate another detailed flow chart for an alternate method of driving screws. These flow charts will be discussed in the context of the electric screwdriver assembly 100 illustrated in FIGS. 1-5 and 8 and with reference to the series of FIGS. 9A-K. However, the acts disclosed herein may be executed using a variety of screw driving equipment, in accordance with the described methods.

As described herein, at least some of the acts described below may be orchestrated by one or more controllers according to an automatic screw driving algorithm. In one embodiment, the one or more controllers may be programmed using computer-readable instructions stored in computer-readable memory that are executed by a processor. A hardware implementation of one or more of the acts may also be employed, in other embodiments.

Referring to the first part 700a of the method, at act 702, a "start" button 132 is pressed. The operator may thus interact with a user interface of the electric screwdriver assembly 100 in order to initiate the screw driving process. At act 704, a distal partial vacuum and middle partial vacuum are turned on. In one embodiment, the controller 116 may control the vacuum generator 112 and the second vacuum generator 128 (and/or one or more valves coupled to these vacuum generators) and may thereby cause both the distal partial vacuum and middle partial vacuum to turn on. During the screw driving process, the controller 116 may leave the distal partial vacuum turned on and may control the middle partial vacuum as described in greater detail below.

At act 706, a first screw 118a is dispensed from a screw feeder 124. FIG. 9B illustrates the first screw 118a immediately after being dispensed. In one embodiment, the screw feeder 124 may hold a plurality of screws 118 and may dispense them one at a time. These screws 118 may then drop under the force of gravity along the screw path 108 within the screw feeding adaptor 106. As illustrated in FIG. 9C, the first screw 118a may then be held at a buffer position in the middle region 108b since the middle partial vacuum is turned on.

At act 708, it is determined whether or not the first screw 118a has been detected. In one embodiment, the first screw 118a may be detected by a screw detector 134 as it travels along the screw path 108. If the first screw 118a has not been detected, then the screw feeder 124 may attempt again to dispense a screw at act 706. If the first screw 118a has been detected, the process continues to act 710.

At act 710, the middle partial vacuum may be lessened. The first screw 118a may thus be allowed to drop from the buffer position to a driving position (FIGS. 9D and 9E illustrate a path of the first screw 118a traveling between these two positions). In one embodiment, the middle partial vacuum may be completely shut off. However, in other embodiments, the middle partial vacuum may only be lessened sufficiently to allow the first screw 118a to fall beyond the middle perforated region 138 towards the distal end 108c of the path 108.

At act 712, the first screw 118a is held at a driving position. In one embodiment, the first screw 118a is held at the driving position by applying the distal partial vacuum within the screw feeding adaptor 106. This driving position is illustrated in FIG. 9F. At act 714, the electric screwdriver 102 engages the first screw 118a. As illustrated in FIG. 9G, the bit 104 of the screwdriver 102 may be advanced within the electric screwdriver assembly 100 to engage the first screw 118a, while the first screw 118a is held at the driving position. The distal partial vacuum may then be maintained as the bit 104 engages the first screw 118a and pushes it towards the distal end 108c of the screw path 108 (as illustrated in FIG. 9H).

At act 716, the first screw 118a is driven. In one embodiment, a separate screwdriver controller 130 may control this screw driving process. However, in other embodiments, the controller 116 may also be involved. Any of a number of algorithms may be used to determine how far and how rapidly to drive the first screw 118a.

At act 718, it is determined whether or not a minimum torque threshold has been reached. In one embodiment, a torque applied to the first screw 118a while driving the first screw 118a is detected. As described above, the electric screwdriver assembly 100 may include a torque sensor 114 configured to detect the torque. The minimum torque threshold may be associated with a successful screw driving process. In other embodiments, the minimum torque threshold may simply indicate that the first screw 118a is sufficiently engaged with a workpiece 120, such that, when the bit 104 is retracted, the first screw 118a will not follow the bit 104 back along the screw path 108.

If the minimum torque threshold has not been reached (e.g., after some time period), at act 720, the first screw 118a is re-driven. For example, the bit 104 may be retracted to disengage the first screw 118a from the workpiece 120, and the bit 104 may then be advanced again to begin the screw re-driving process. The torque during the re-driving process may again be detected and compared to the minimum torque threshold at act 718. If the minimum torque threshold is not reached after two retries, an error may be generated at act 722. The generated error may signal an operator that the first screw 118a should be manually removed from the electric screwdriver assembly 100 before continuing screw driving operations.

If the minimum torque threshold is reached, then at act 724 a signal is sent to the controller 116. The signal may indicate that the torque has reached or exceeded the minimum torque threshold. The method may then continue with the second part 700b of the method illustrated in FIG. 7B, or with an alternative second part 700c of the method illustrated in FIG. 7C.

As illustrated in FIG. 7B, upon receiving a signal indicating that the torque has reached the minimum torque threshold, at act 726, the middle partial vacuum is turned back on, and, at act 728, a second screw 118b is dispensed from the screw feeder 124. The second screw 118b may then be held at the buffer position since the middle partial vacuum is turned on (see FIG. 9J). Meanwhile, after driving the first screw 118a, the bit 104 may withdraw proximally from a distal portion of the screw path 108, as illustrated in FIG. 9J.

At act 730, it is determined whether or not the second screw 118b has been detected. In one embodiment, the screw detector 134 may detect the second screw 118b as it travels along the screw path 108. If the second screw 118b has not been detected, then the screw feeder 124 may attempt again to dispense a screw at act 728. If the second screw 118b has been detected, the process continues to act 732.

At act 732, it is determined if the bit 104 is out of the screw path 108 (as illustrated in FIG. 9K). If the bit 104 is not yet out of the screw path 108, the process may cycle while the middle partial vacuum is maintained at act 734. As described above, the electric screwdriver assembly 100 may include a bit detector 136 configured to detect a location of the bit 104 relative to the screw path 108. The bit detector 136 may be coupled to the controller 116, and the controller 116 may receive bit position information indicative of the bit 104 being out of the screw path 108 from the bit detector 136.

Once it is determined that the bit 104 is out of the screw path 108, then the middle partial vacuum may be lessened at act 736. The second screw 118b may thus be allowed to drop from the buffer position to the driving position, and the method may return to act 712, wherein the second screw 118b is held at the driving position.

In another embodiment, as illustrated in FIG. 7C, the middle partial vacuum may be turned on at act 738 at any point after the first screw 118a has moved beyond the buffer position (e.g., when the first screw 118a is positioned as illustrated in FIGS. 9D-H). At act 740, the second screw 118b is dispensed from the screw feeder 124 (again, at any point after the first screw 118a has moved beyond the buffer position). The second screw 118b may then be held at the buffer position since the middle partial vacuum is turned on.

At act 742, it is determined whether or not the second screw 118b has been detected. In one embodiment, the screw detector 134 may detect the second screw 118b as it travels along the screw path 108. If the second screw 118b has not been detected, then the screw feeder 124 may attempt again to dispense a screw at act 740. If the second screw 118b has been detected, the process continues to act 744.

At act 744, the method waits for the signal to the controller 116 indicating that the torque applied to the first screw 118a has reached the minimum torque threshold. Once the controller 116 receives this signal, then at act 746, it is determined if the bit 104 is out of the screw path 108. If the bit 104 is not yet out of the screw path 108, the process may cycle while the middle partial vacuum is maintained at act 748.

Once it is determined that the bit 104 is out of the screw path 108, then the middle partial vacuum may be lessened at act 750. The second screw 118b may then be allowed to drop from the buffer position to the driving position, and the method may return to act 712, wherein the second screw 118b is held at the driving position.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

I claim:

1. A method of driving screws using an electric screwdriver and an automatic screw feeding adaptor coupled to the electric screwdriver, the screw feeding adaptor defining a screw path having a proximal end, a middle region and a distal end, the method comprising:
receiving a first screw within the screw feeding adaptor;
holding the first screw at a driving position near the distal end of the screw path by applying a distal partial vacuum within the screw feeding adaptor;
driving the first screw;
detecting a torque applied to the first screw while driving the first screw;
comparing the torque to a minimum torque threshold; and
moving a second screw along the screw path based at least in part upon the comparison.

2. The method of claim 1, wherein the second screw is moved along the screw path based at least in part upon the torque exceeding the minimum torque threshold.

3. The method of claim 2, wherein moving the second screw along the screw path includes allowing the second screw to drop to the driving position near the distal end of the screw path.

4. The method of claim 3, further comprising determining that a bit of the electric screwdriver is out of the screw path, wherein allowing the second screw to drop to the driving position is further based at least in part on determining that the bit of the electric screwdriver is out of the screw path.

5. The method of claim 3, further comprising holding the second screw at the driving position near the distal end by applying the distal partial vacuum within the screw feeding adaptor.

6. The method of claim 1, further comprising:
holding the first screw at a buffer position in the middle region by applying a middle partial vacuum within the screw feeding adaptor before holding the first screw at the driving position; and
lessening the middle partial vacuum and allowing the first screw to drop from the buffer position to the driving position.

7. The method of claim 6, wherein moving the second screw along the screw path includes allowing the second screw to drop to the buffer position based at least in part upon the torque exceeding the minimum torque threshold, the method further comprising holding the second screw at the buffer position by applying the middle partial vacuum.

8. The method of claim 7, further comprising:
determining that a bit of the electric screwdriver is out of the screw path;
lessening the middle partial vacuum and allowing the second screw to drop from the buffer position to the driving position based at least in part on determining that the bit of the electric screwdriver is out of the screw path; and
holding the second screw at the driving position by applying the distal partial vacuum within the screw feeding adaptor.

9. The method of claim 6, further comprising:
holding the second screw at the buffer position by applying the middle partial vacuum while driving the first screw;
wherein moving the second screw along the screw path includes lessening the middle partial vacuum and allowing the second screw to drop from the buffer position to the driving position based at least in part on the comparison.

10. The method of claim 9, further comprising:
determining that a bit of the electric screwdriver is out of the screw path;
wherein the second screw is allowed to drop from the buffer position to the driving position based at least in part on determining that the bit of the electric screwdriver is out of the screw path.

11. The method of claim 1, further comprising:
driving the second screw;
detecting a second torque applied to the second screw while driving the second screw;
comparing the second torque to the minimum torque threshold;
re-driving the second screw based at least in part on the second torque not exceeding the minimum torque threshold;
detecting a third torque applied to the second screw while re-driving the second screw;
comparing the third torque to the minimum torque threshold; and
generating an error if the third torque does not exceed the minimum torque threshold.

* * * * *